US010585854B2

(12) United States Patent
Seker et al.

(10) Patent No.: US 10,585,854 B2
(45) Date of Patent: Mar. 10, 2020

(54) ESTABLISHING AND ENFORCING SELECTIVE OBJECT DELETION OPERATIONS ON CLOUD-BASED SHARED CONTENT

(71) Applicant: Box, Inc., Redwood City, CA (US)

(72) Inventors: Emrah Seker, San Jose, CA (US); Alam Karim, Burnaby (CA); Jessica Lynn Fain, San Francisco, CA (US); Joy Keiko Ebertz, San Jose, CA (US); Raymond Louis Thang, Sunnyvale, CA (US); Steven La, Sunnyvale, CA (US); Shengzhi Sun, San Jose, CA (US); Ryan Taylor Churchill, San Francisco, CA (US); Anne Elizabeth Hiatt Pearl, San Francisco, CA (US)

(73) Assignee: Box, Inc., Redwood City, CA (US)

( * ) Notice: Subject to any disclaimer, the term of this patent is extended or adjusted under 35 U.S.C. 154(b) by 251 days.

(21) Appl. No.: 15/491,923

(22) Filed: Apr. 19, 2017

(65) Prior Publication Data
US 2017/0371890 A1 Dec. 28, 2017

Related U.S. Application Data

(60) Provisional application No. 62/354,621, filed on Jun. 24, 2016.

(51) Int. Cl.
*G06F 16/16* (2019.01)
*G06F 16/11* (2019.01)

(52) U.S. Cl.
CPC .......... *G06F 16/162* (2019.01); *G06F 16/122* (2019.01)

(58) Field of Classification Search
CPC .............................. G06F 16/162; G06F 16/122
(Continued)

(56) References Cited

U.S. PATENT DOCUMENTS 5,806,074 A * 9/1998 Souder ................ G06F 11/2035
6,330,572 B1 * 12/2001 Sitka ..................... G06F 19/321
707/608

(Continued)

FOREIGN PATENT DOCUMENTS

EP 0251089 A2 * 1/1988 ........... G06F 17/245

OTHER PUBLICATIONS

Strzelczak et al., "Concurrent Deletion in a Distributed Content-Addressable Storage System with Global Deduplication", in Proceedings of the 11th USENIX Conference on File and Storage Technologies (FAST' 13), San Jose, CA, Feb. 12-15, 2013, pp. 161-174. (Year: 2013).*

(Continued)

*Primary Examiner* — Phuong Thao Cao
(74) *Attorney, Agent, or Firm* — Vista IP Law Group, LLP

(57) ABSTRACT

Systems for enforcing multiple object deletion policies over shared content objects that are accessible in a cloud-based service platform. A method embodiment commences upon receiving two or more sets of file deletion parameters that describe respective two or more object deletion policies covering a portion of the shared content objects. Records that form associations between the file deletion parameters and at least some of the shared content objects are made available to event listeners in the system. Upon detecting events associated with access to the shared content by the users, the event listeners analyze the events to identify objects of the shared content that are associated with the multiple object deletion policies. If an object is covered by conflicting deletion policy actions, then actions of the deletion policy having a higher priority are applied. Some actions prevent or delay modification of the objects. Lower priority data retention deletions are suppressed.

18 Claims, 16 Drawing Sheets

(58) Field of Classification Search
USPC .......................................................... 707/692
See application file for complete search history.

(56) References Cited

U.S. PATENT DOCUMENTS

| | | | |
|---|---|---|---|
| 6,570,555 B1* | 5/2003 | Prevost | G06F 3/01 345/156 |
| 6,651,096 B1* | 11/2003 | Gai | H04L 63/0263 709/223 |
| 7,478,096 B2* | 1/2009 | Margolus | G06F 16/2358 |
| 7,496,555 B2* | 2/2009 | Margolus | G06F 16/2358 |
| 7,814,063 B1* | 10/2010 | Kilday | G06F 16/20 707/663 |
| 7,818,300 B1* | 10/2010 | Kilday | G06Q 50/18 707/662 |
| 7,930,315 B2* | 4/2011 | Margolus | G06F 16/2358 707/781 |
| 7,974,948 B2* | 7/2011 | Baer | G06F 16/93 707/638 |
| 8,006,290 B2* | 8/2011 | Agrawal | H04L 63/102 707/694 |
| 8,291,031 B1* | 10/2012 | Kirkham | H04L 51/34 709/203 |
| 8,352,391 B1* | 1/2013 | Kapadia | H04L 63/0263 706/14 |
| 8,972,354 B1* | 3/2015 | Telang | G06Q 10/10 707/653 |
| 9,002,805 B1* | 4/2015 | Barber | G06F 16/215 707/692 |
| 9,063,940 B1* | 6/2015 | Humby | G06F 16/125 |
| 9,137,251 B2* | 9/2015 | Xie | H04L 63/102 |
| 10,120,763 B1* | 11/2018 | Whitmer | G06F 11/1453 |
| 10,261,944 B1* | 4/2019 | Armangau | G06F 16/128 |
| 2002/0083081 A1* | 6/2002 | Chen | G06F 11/1435 |
| 2004/0167898 A1* | 8/2004 | Margolus | G06F 16/2358 |
| 2004/0177139 A1* | 9/2004 | Schuba | H04L 41/0873 709/223 |
| 2005/0055519 A1* | 3/2005 | Stuart | G06F 16/122 711/159 |
| 2005/0105769 A1* | 5/2005 | Sloan | A63H 3/28 382/103 |
| 2005/0193024 A1* | 9/2005 | Beyer | G06F 16/273 |
| 2006/0026220 A1* | 2/2006 | Margolus | G06F 16/2358 |
| 2006/0031340 A1* | 2/2006 | Mathew | G06Q 10/107 709/206 |
| 2006/0212924 A1* | 9/2006 | Xie | H04L 63/102 726/1 |
| 2006/0230044 A1* | 10/2006 | Utiger | G06F 16/23 |
| 2006/0259468 A1* | 11/2006 | Brooks | H04L 51/34 |
| 2007/0130232 A1* | 6/2007 | Therrien | G06F 8/71 |
| 2007/0179790 A1* | 8/2007 | Leitch | G06Q 10/0633 705/301 |
| 2007/0283011 A1* | 12/2007 | Rakowski | H04L 41/0803 709/225 |
| 2007/0283049 A1* | 12/2007 | Rakowski | G06F 9/44505 709/246 |
| 2008/0046963 A1* | 2/2008 | Grayson | H04L 12/66 726/1 |
| 2008/0109448 A1* | 5/2008 | Aboel-Nil | G06Q 10/107 |
| 2008/0163258 A1* | 7/2008 | Balasubramanian | G05B 23/0267 719/318 |
| 2008/0301756 A1* | 12/2008 | Demarest | G06Q 10/10 726/1 |
| 2009/0150168 A1* | 6/2009 | Schmidt | G06Q 10/10 705/311 |
| 2009/0228530 A1* | 9/2009 | Anglin | G06F 11/1451 |
| 2009/0276471 A1* | 11/2009 | Baer | G06F 16/93 |
| 2010/0082652 A1* | 4/2010 | Jones | G06Q 30/02 707/758 |
| 2010/0088528 A1* | 4/2010 | Sion | G06F 21/64 713/193 |
| 2010/0095349 A1* | 4/2010 | Motoyama | H04L 63/10 726/1 |
| 2010/0306283 A1* | 12/2010 | Johnson | G06F 16/125 707/803 |
| 2010/0312751 A1* | 12/2010 | Anglin | G06F 11/1458 707/638 |
| 2011/0106802 A1* | 5/2011 | Pinkney | G06F 21/604 707/737 |
| 2011/0131185 A1* | 6/2011 | Kirshenbaum | G06F 11/1448 707/654 |
| 2011/0320494 A1* | 12/2011 | Fisher | G06F 16/93 707/780 |
| 2012/0198022 A1* | 8/2012 | Black | H04L 67/1097 709/217 |
| 2013/0024423 A1* | 1/2013 | Doshi | G06F 11/1448 707/640 |
| 2013/0080411 A1* | 3/2013 | Rolia | G06Q 10/10 707/694 |
| 2014/0025645 A1* | 1/2014 | Brown | G06F 16/25 707/691 |
| 2014/0095456 A1* | 4/2014 | Pidduck | G06F 17/2288 707/695 |
| 2014/0249875 A1* | 9/2014 | Junker | G06Q 10/06 705/7.11 |
| 2015/0081624 A1* | 3/2015 | Masse | G06Q 10/103 707/608 |
| 2015/0207888 A1* | 7/2015 | Swanson | G06F 16/84 709/219 |
| 2015/0331475 A1* | 11/2015 | Hirai | G06F 1/3284 713/323 |
| 2015/0350371 A1* | 12/2015 | Woods | G06F 16/51 707/620 |
| 2015/0370792 A1* | 12/2015 | Chen | G06F 16/1873 707/695 |
| 2015/0370793 A1* | 12/2015 | Chen | G06F 16/1873 707/695 |
| 2016/0191466 A1* | 6/2016 | Pernicha | H04L 63/20 726/1 |
| 2017/0060886 A1* | 3/2017 | Adam | G06F 16/125 |
| 2017/0147404 A1* | 5/2017 | Chen | G06F 9/5038 |
| 2017/0364681 A1* | 12/2017 | Roguine | G06F 21/554 |
| 2018/0025011 A1* | 1/2018 | Aksionkin | H04L 63/20 707/692 |
| 2018/0131720 A1* | 5/2018 | Hobson | H04L 63/0263 |

OTHER PUBLICATIONS

"Legal Hold", Wikipedia, URL: https://en.wikipedia.org/wiki/Legal_hold, Mar. 24, 2016.

* cited by examiner

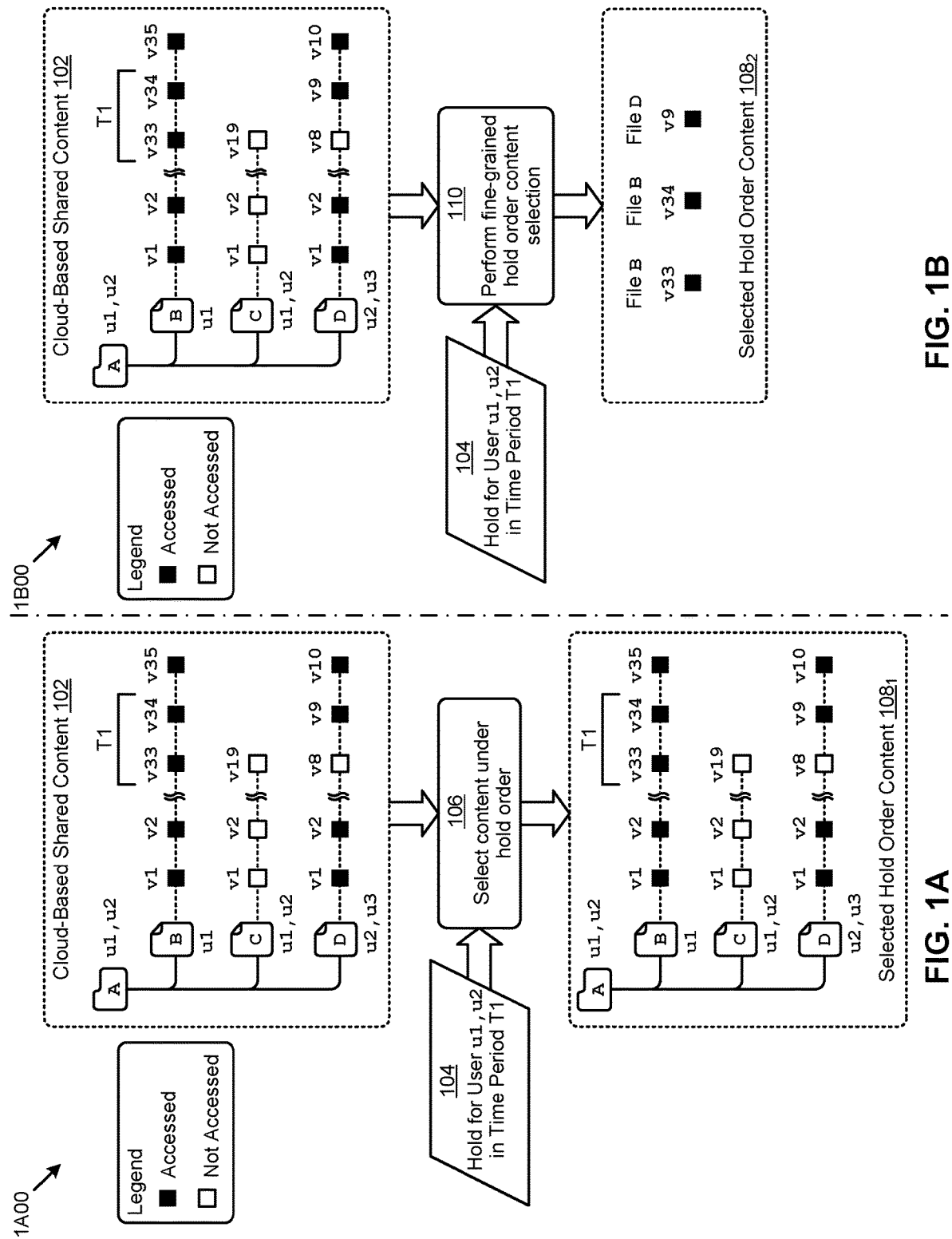

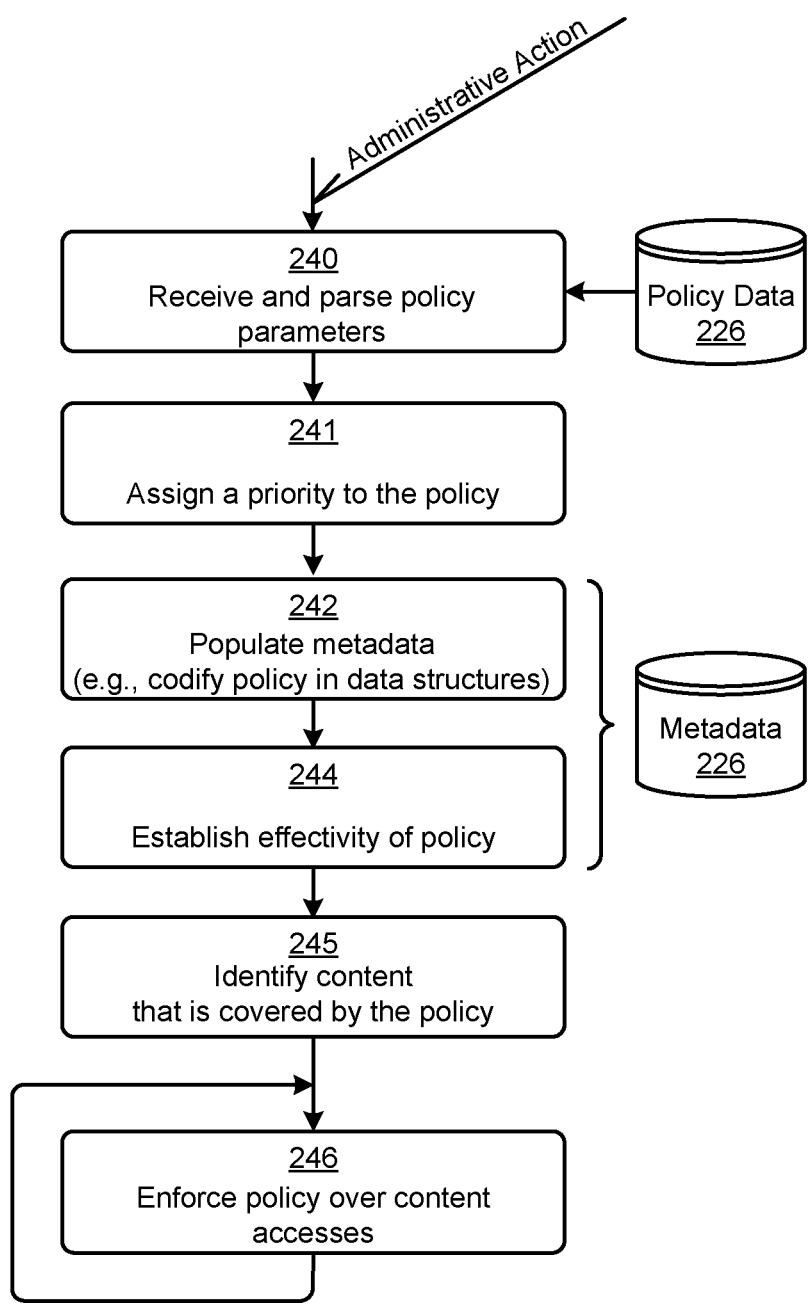
FIG. 2B1

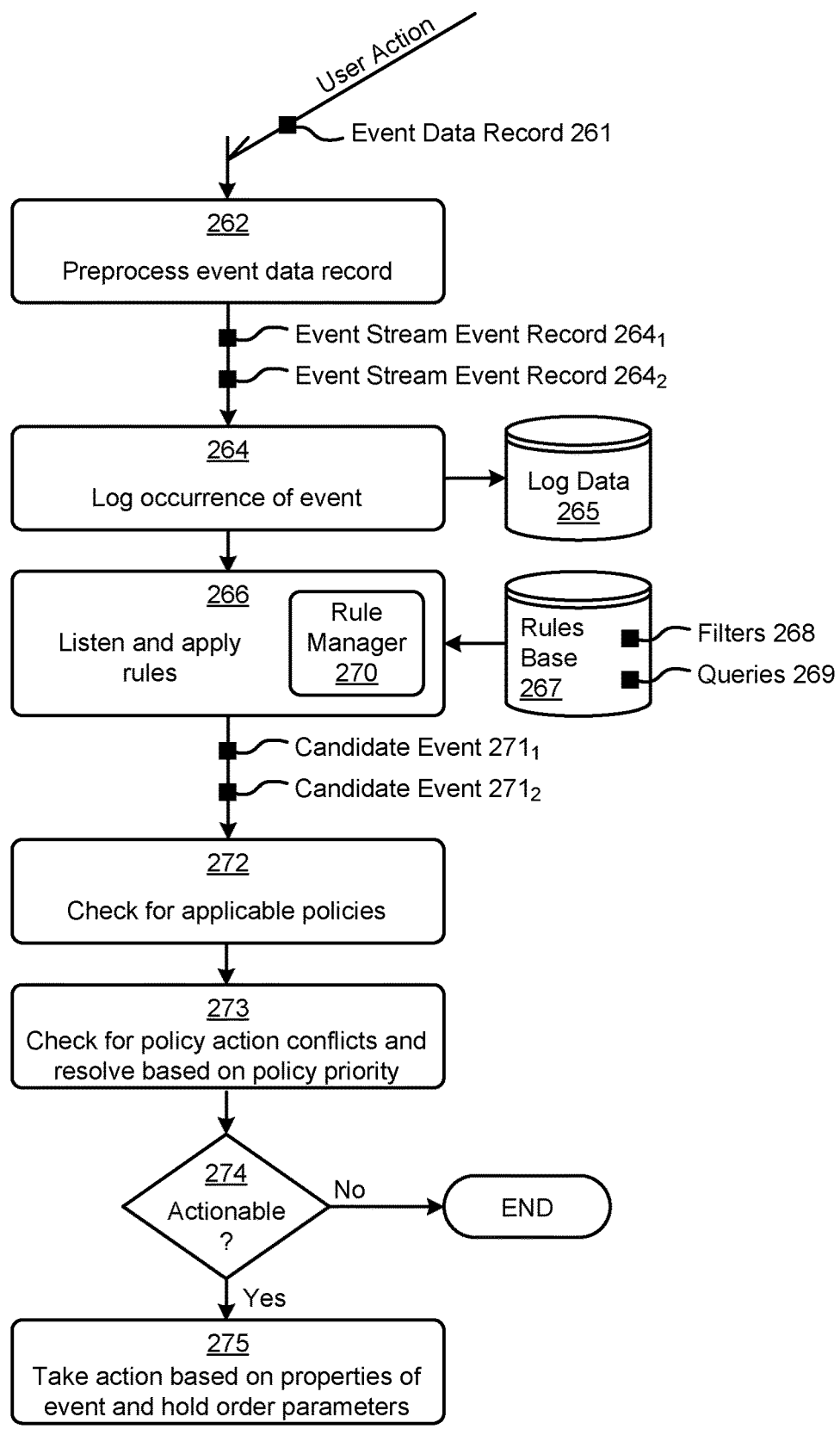
FIG. 2B2

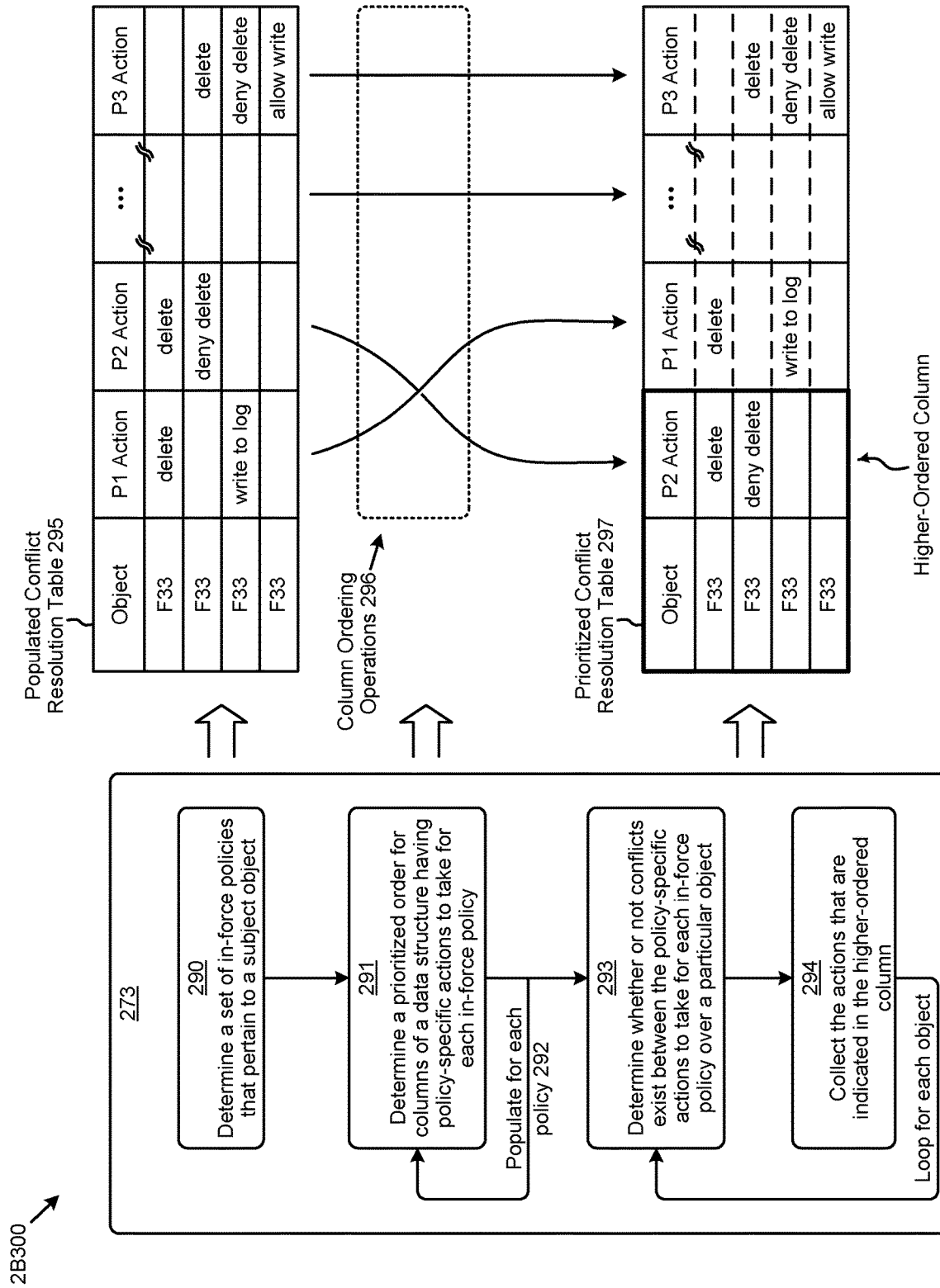
FIG. 2B3

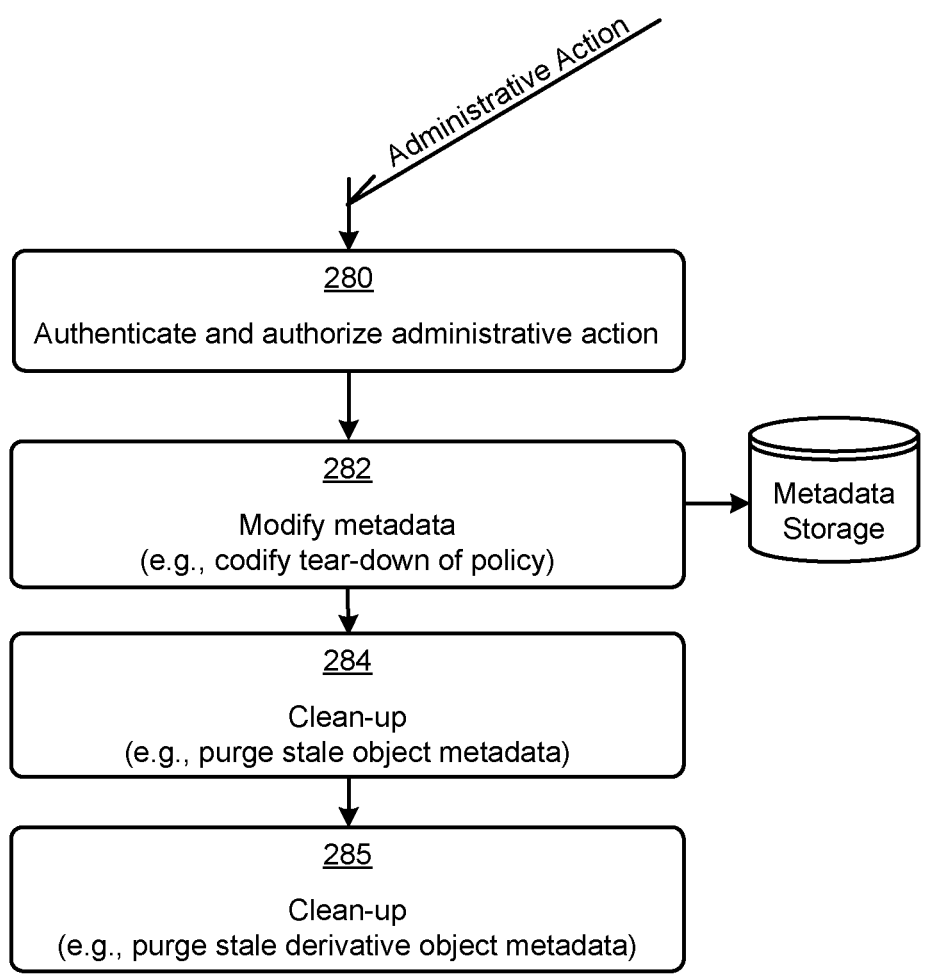
FIG. 2B4

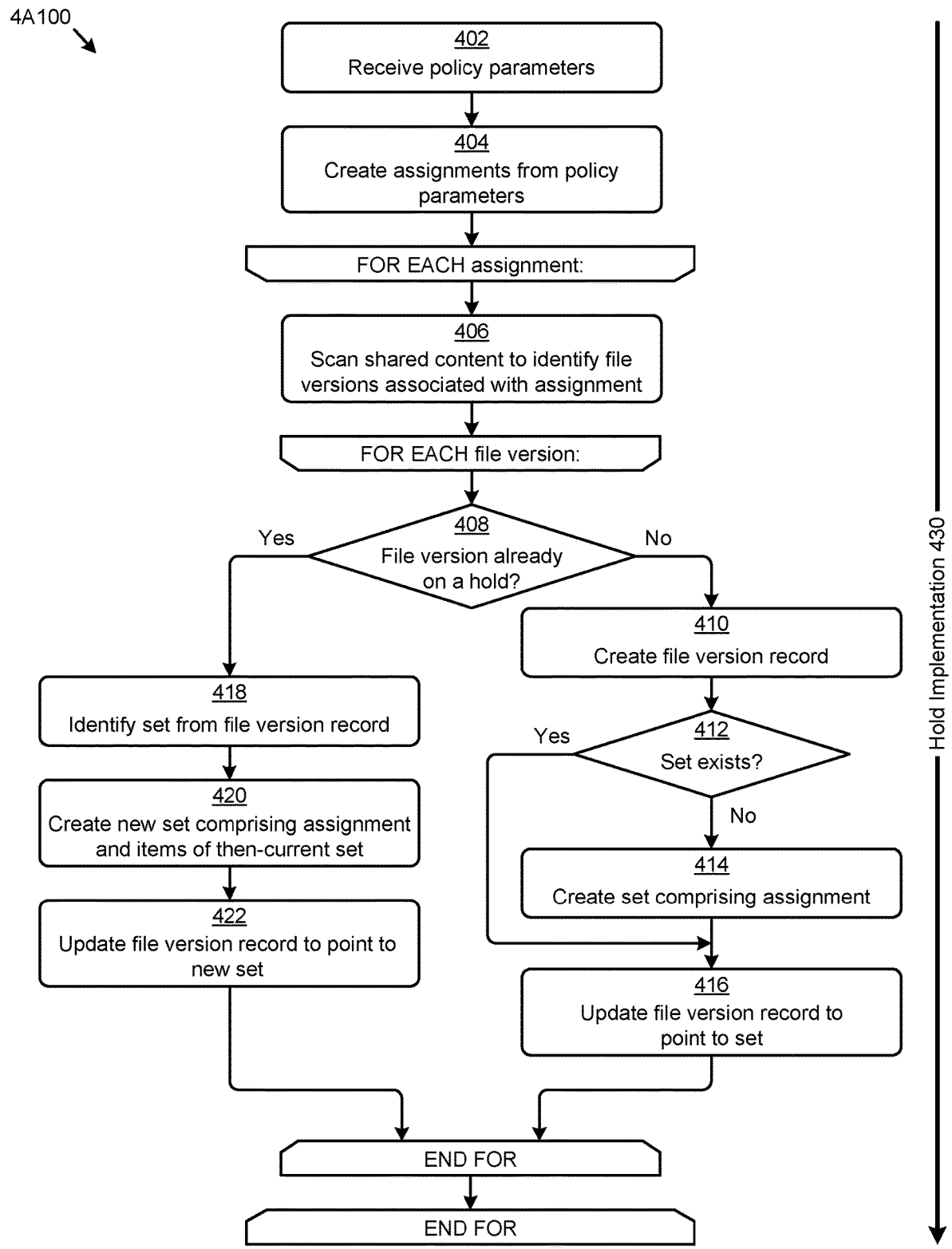
FIG. 4A1

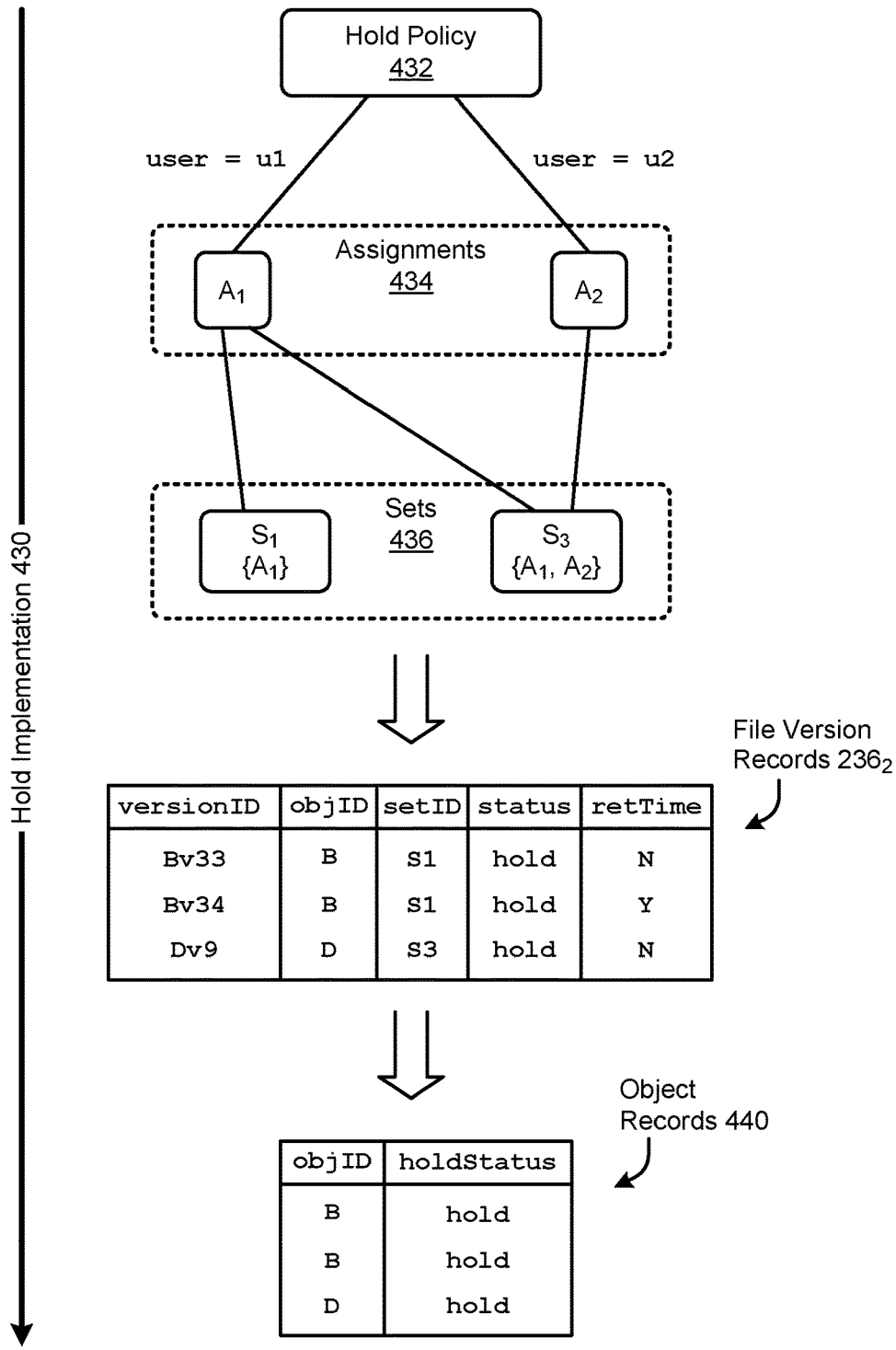
FIG. 4A2

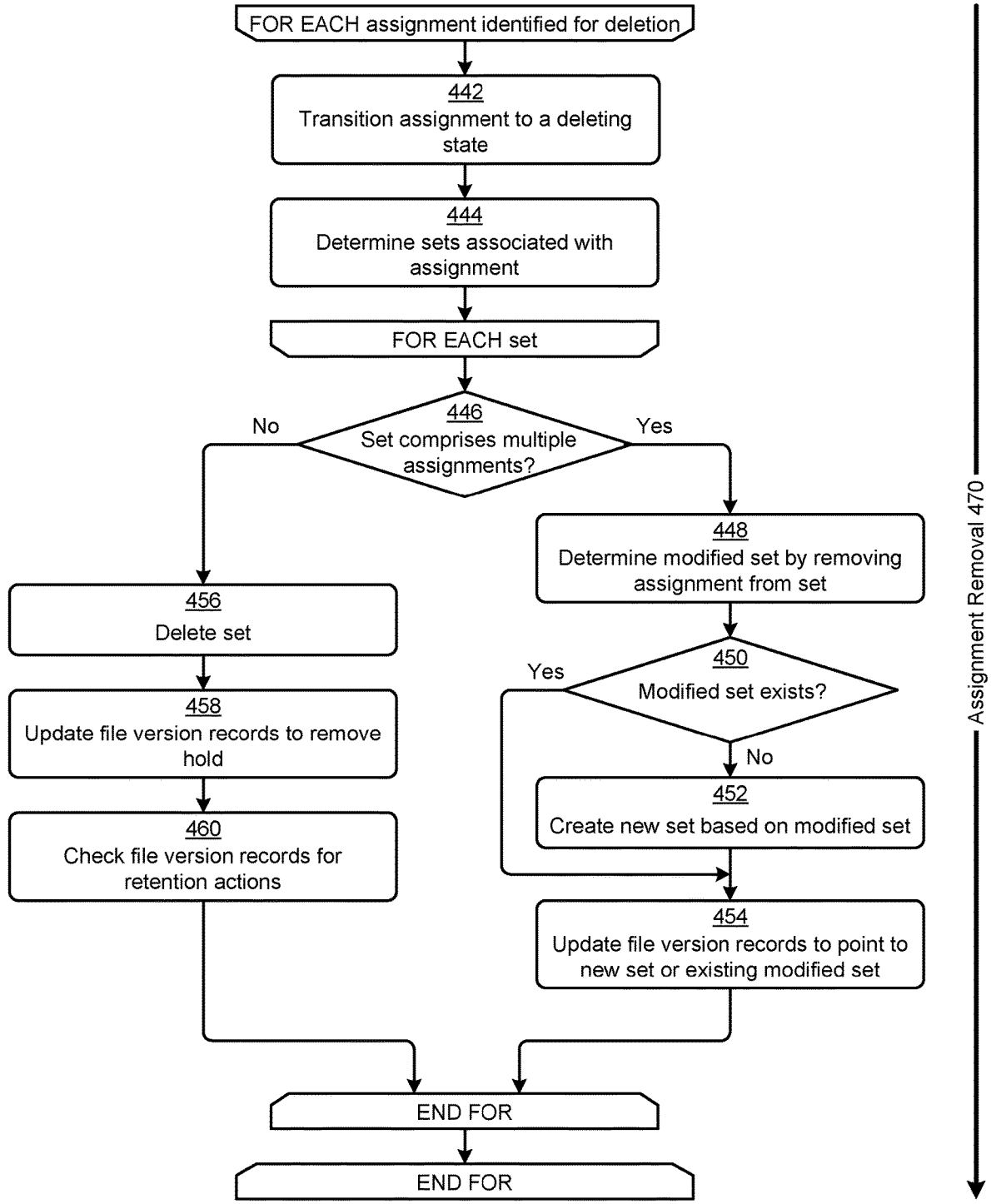
FIG. 4B1

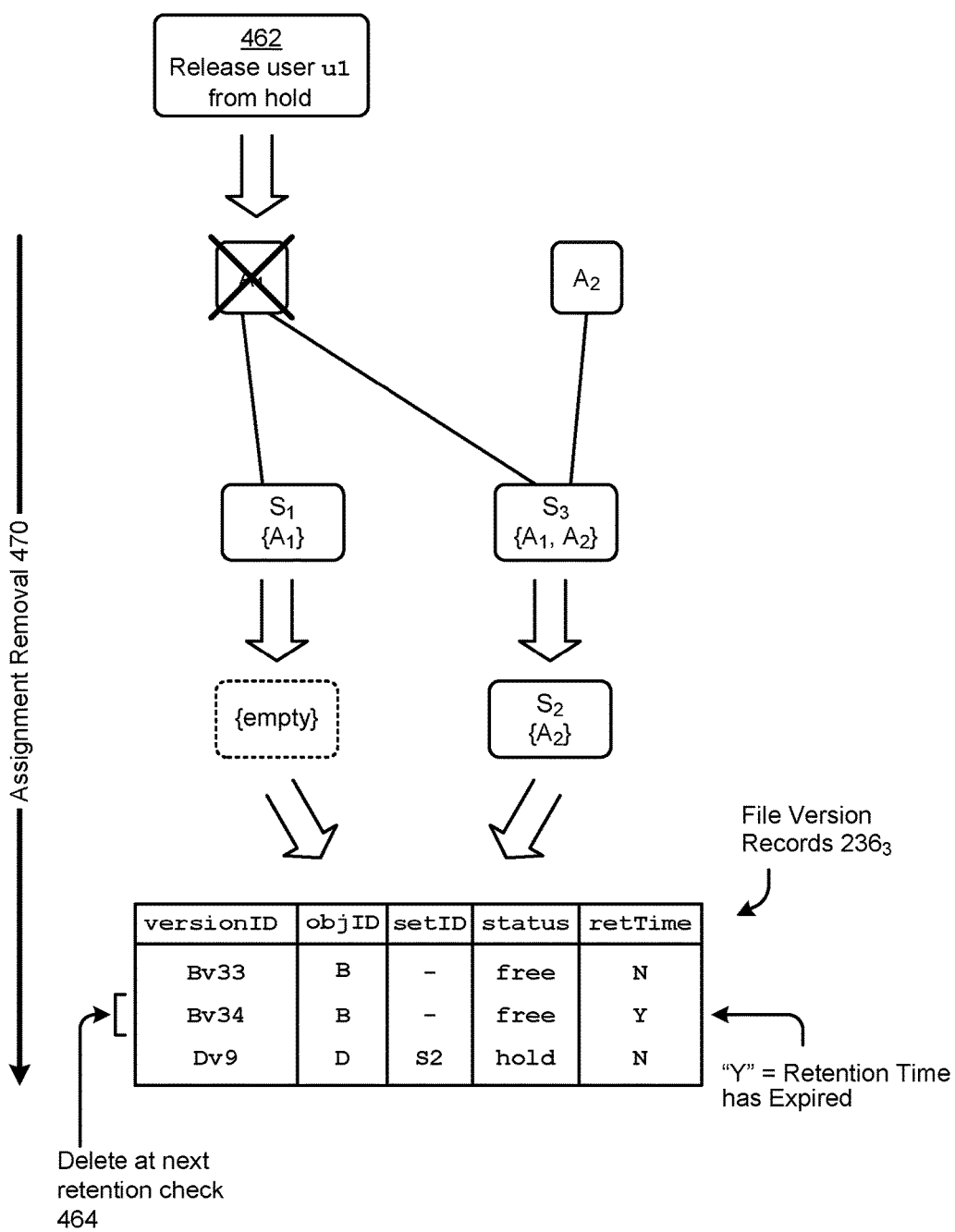
FIG. 4B2

ESTABLISHING AND ENFORCING SELECTIVE OBJECT DELETION OPERATIONS ON CLOUD-BASED SHARED CONTENT

RELATED APPLICATIONS

The present application claims the benefit of priority to U.S. Provisional Patent Application Ser. No. 62/354,621 titled "COORDINATED SCHEMES FOR ESTABLISHING AND ENFORCING SELECTIVE OPERATIONS ON CLOUD-BASED SHARED CONTENT", filed Jun. 24, 2016, which is hereby incorporated by reference in its entirety.

FIELD

This disclosure relates to managing content in a cloud-based service platform, and more particularly to techniques for efficiently establishing and enforcing selective operations on cloud-based shared content.

BACKGROUND

Proliferation of cloud-based content management services and rapid adoption of cloud-based collaboration have impacted the way personal and corporate electronically stored information objects (e.g., files, images, videos, etc.) are stored, shared and managed. One benefit of using cloud-based platforms is the ability to securely create and share large volumes of content among trusted collaborators. For example, a large enterprise with thousands of users (e.g., employees) and many terabytes of content might use a cloud-based content storage platform to efficiently and securely facilitate content access to various individual users and/or collaborative groups of users. The users can have access to content the users own (e.g., create, first upload to the cloud-based platform, etc.) and content shared with the users. In all cases, the users expect their content to be available when access is requested.

The cloud-based content storage provider can provide such data availability at least in part by implementing certain data retention policies. For example, data retention techniques can be used to manage selective deletion of content and/or manage purges of data on a schedule, which can be set in line with regulatory obligations (e.g., government regulations). In many cases, data retention policies can be specified according to a service level agreement with an enterprise. In other cases, data retention might be influenced by other factors, such as a "legal hold". When under a legal hold order, an organization has a duty to preserve relevant information when it learns, or reasonably should have learned of pending or threatened litigation, or of a regulatory investigation.

In order to comply with hold policy or hold order preservation obligations, the organization should inform records custodians of the respective custodians' duty to preserve relevant information. Organizational use of cloud services introduces the need for techniques that go beyond managing file cabinets and boxes of paper. A hold that is acted on by an organization might extend to relevant information in the form of materials that are stored as cloud-based stored content. A hold might pertain to cloud-based stored content that is associated with particular users, and/or pertaining to cloud-based activities that have occurred within a certain period of time, and/or might pertain to certain subject matter.

Unfortunately, legacy techniques for implementing holds on cloud-based shared content are limited at least as pertaining to efficiently managing a selected portion of the content governed by the parameters of a given hold order. Specifically, some approaches might apply a hold order on any content associated with users identified as participants in the hold order. However, some of the users might have permission (e.g., by ownership, by collaboration, by group membership, etc.) to access many thousands of content objects (e.g., folders, files, files versions, etc.) even though only a small percentage of those many thousands of content objects are pertinent to the parameters of the hold order.

For example, a hold order might merely pertain to objects actually accessed (e.g., opened, viewed, etc.) by the user. In such cases, large volumes of data might be unnecessarily marked, sequestered and/or retained longer than needed. Unnecessarily marking and/or sequestering and/or retaining an unnecessarily large amount of data can cause decreased performance and/or increased storage demands on the cloud-based storage system. Some legacy approaches apply a hold order to any or all folders and/or files accessible by certain users associated with the hold order.

Other legacy approaches apply a hold order to any or all folders and files that were created and/or modified over the time period associated with the hold order. However, in highly collaborative environments, certain files can have many versions, some of which versions might have been created or modified during time periods outside of the bounds of the hold order time period. Acting on a hold order in a manner that such versions outside the hold order time period are marked and/or sequestered and/or retained and/or are otherwise acted upon can cause decreased performance and/or can cause increased storage demands on the cloud-based storage system. Moreover, legacy approaches fail to reconcile conflicts that arise between hold policies, such as when two or more policies are in force at the same time but are in conflict with respect to their specifications or are in conflict with respect then-current application of their specifications.

What is needed is a technique or techniques to improve over legacy and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for efficiently establishing and enforcing selective operations on cloud-based shared content, which techniques advance the relevant technologies to address technological issues with legacy approaches. More specifically, the present disclosure provides a detailed description of techniques used in systems, methods, and in computer program products for efficiently establishing and enforcing selective operations on cloud-based shared content. Certain embodiments are directed to technological solutions for capturing content access events to facilitate fine-grained assignments of object deletion policies to selected sets of content.

The disclosed embodiments modify and improve over legacy approaches. In particular, the herein-disclosed techniques provide technical solutions that address the technical problems attendant to efficiently selecting and/or managing cloud-based shared content governed by one or more hold orders. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication.

Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-performance computing as well as advances in various technical fields related to data storage.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

FIG. 1A illustrates a hold order content selection technique.

FIG. 1B presents a fine-grained content selection technique as implemented in systems for efficiently establishing and enforcing selective operations on cloud-based shared content, according to some embodiments.

FIG. 2B1, FIG. 2B2, FIG. 2B3, and FIG. 2B4 are block diagrams of flows that efficiently enforce hold orders on cloud-based shared content, according to some embodiments.

FIG. 3 is a diagrammatic representation of data structures used in systems for efficiently establishing and enforcing selective operations on cloud-based shared content, according to an embodiment.

FIG. 4A1 depicts a hold order implementation technique as used in systems for efficiently establishing and enforcing selective operations on cloud-based shared content, according to an embodiment.

FIG. 4A2 illustrates a hold order implementation flow as used in systems for efficiently establishing and enforcing selective operations on cloud-based shared content, according to an embodiment.

FIG. 4B1 depicts an assignment removal technique as used in systems for efficiently establishing and enforcing selective operations on cloud-based shared content, according to an embodiment.

FIG. 4B2 illustrates an assignment removal flow as used in systems for efficiently establishing and enforcing selective operations on cloud-based shared content, according to an embodiment.

DETAILED DESCRIPTION

Figure 2A:
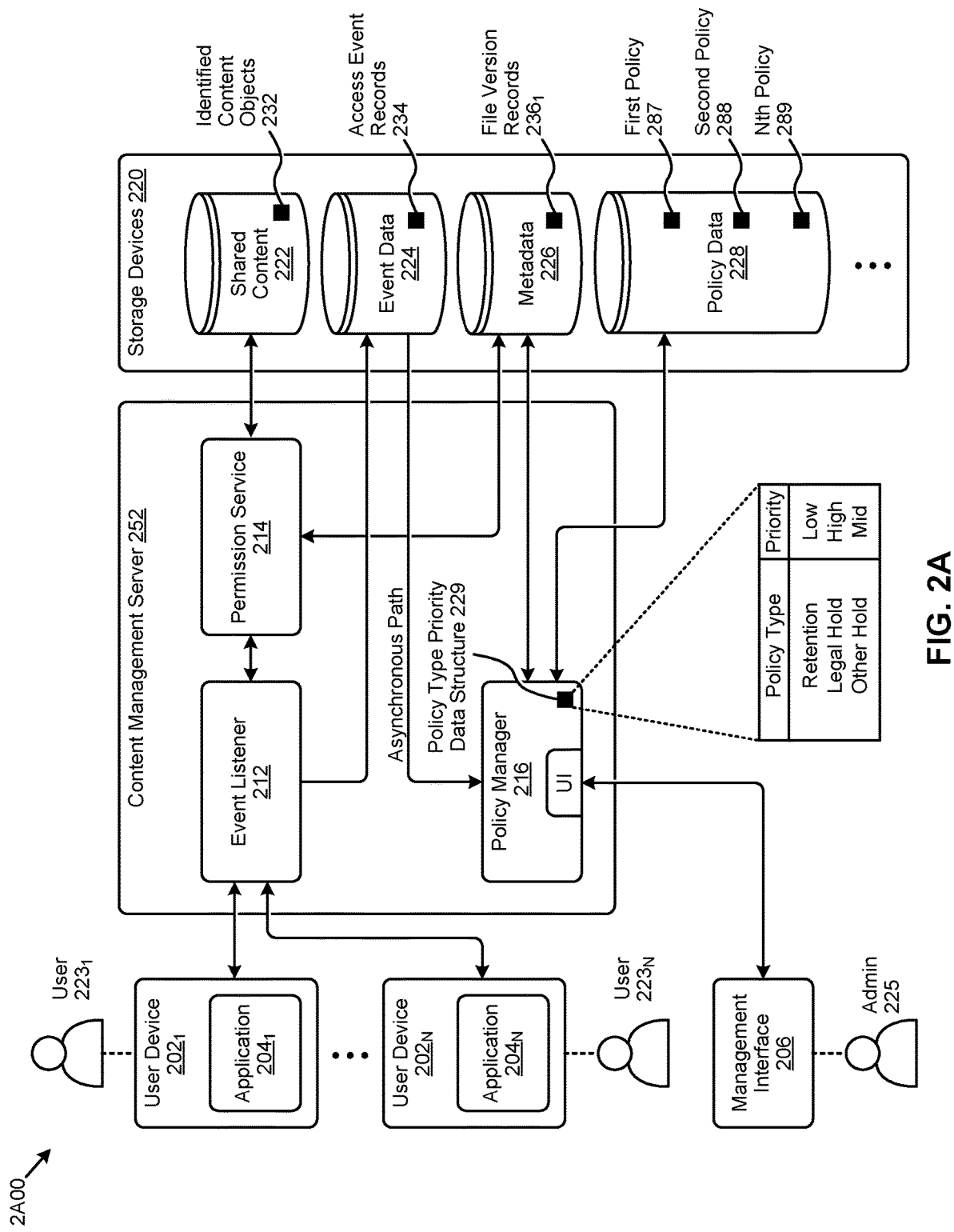
FIG. 2A is a block diagram of a system that efficiently enforces hold orders on cloud-based shared content, according to an embodiment.

Some embodiments of the present disclosure address the problem of efficiently selecting and/or managing cloud-based shared content governed by a hold order. Some embodiments are directed to approaches for capturing content access events to facilitate fine-grained assignments of object deletion policies to selected sets of content. The accompanying figures and discussions herein present example environments, systems, methods, and computer program products for efficiently establishing and enforcing selective operations on cloud-based shared content.

Overview

Disclosed herein are techniques that capture content access events to facilitate fine-grained resolution and enforcement of combinations of retention policies, legal hold policies, and other object deletion policies that apply to selected sets of content (e.g., so as to comply with the hold order). When two or more actions pertaining to two or more policies apply to the same data item or items, a conflict check is performed. In the event of a conflict, the highest priority action or actions are taken. For example, an 'old' data item might be slated for an action or actions to delete the 'old' data item under a currently in-force data retention policy for which the data retention period has expired. At the same time, if a hold order is currently in effect for the 'old' data item to not delete that data item, then the data item or items are processed in accordance with the action or actions having a higher priority. Detection and handling of conflicts between actions of policies can be performed at any time there is an event on a covered data item. Such handling can include identification of multiple, possibly conflicting policy actions that are specified (e.g., assigned) so as to cover a particular data item or set of data items. In some embodiments conflict resolution for conflicts that arise from multiple, potentially conflicting policy actions is achieved by arranging columns of a table such that higher priority actions are taken over lower priority actions.

Events that pertain to a requested action on a file or other content item can be processed before the action is taken. More particularly, sets of files or other content items are associated with an assignment record that is used to relate the files or other content items to a policy. Events, including specification of new policies and/or changes to existing policies can occur at any moment in time. In some embodiments, an event listener can capture access events that are then used to create one or more assignment records (e.g., assignments pertaining to users, assignments pertaining to folders, assignments pertaining to files, assignments pertaining to file versions, assignments pertaining to stored objects, etc.) associated with one or more parameters of a given hold order policy. The assignment records are associations between the semantics of the hold order and content objects (e.g., files, file versions) pertaining to the hold order. The identified content objects can be marked (e.g., in metadata) so as to persist the assignment for the duration of the hold order. Such event listening and metadata marking facilitates dynamic management of operations (e.g., delete, move, copy, etc.) that are pending for the identified content objects.

Using event listening techniques down to the file version level of granularity facilitates commensurately fine-grained enforcement. In certain embodiments, additional content (e.g., data that is derived from hold order materials) can be imputed to be associated with a given hold order. Such imputed associations can be made based on listened-for events. In some embodiments, a report of the file versions and/or other characteristics of the content associated with a given hold order can be generated.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A illustrates a hold order content selection technique 1A00. As an option, one or more variations of hold order content selection technique 1A00 or any aspect thereof may be implemented in the context of the architecture and functionality of the embodiments described herein. The hold order content selection technique 1A00 or any aspect thereof may be implemented in any environment.

FIG. 1A illustrates a representative portion of cloud-based shared content 102 that might be subject to a hold order. Specifically, the representative content comprises a folder A accessible by user u1 and user u2. Folder A further comprises a file B accessible by user u1, a file C accessible by user u1 and user u2, and a file D accessible by user u2 and user u3 (e.g., invited by user u2 to collaborate on file D). As shown, various versions of the foregoing files have been created over time, some of which versions have been accessed by the aforementioned users and some of which versions have not been accessed by the users. In response to a hold order pertaining to user u1 and user u2 for the time period T1 (input 104), certain content determined to be subject to the hold order can be selected (at step 106).

Specifically, some approaches might determine a set of selected hold order content $108_1$ by identifying any and all content associated with user u1 and user u2. However, as shown, while the users might have permission to access the content objects, not all were actually accessed. Also, some of the content object versions in selected hold order content $108_1$ were created and/or accessed during time periods outside of the bounds of the hold order time period (e.g., time period T1). Using such approaches to selecting hold order content, large volumes of data might be unnecessarily marked, sequestered, and/or retained longer than needed. Unnecessarily marking and/or sequestering and/or retaining a large amount of data can cause decreased performance and/or increased storage demands on the cloud-based storage system.

The herein disclosed techniques address the foregoing problems attendant to efficiently selecting and/or managing cloud-based shared content governed by a hold order as shown and discussed as pertaining to FIG. 1B.

FIG. 1B presents a fine-grained content selection technique 1B00 as implemented in systems for efficiently establishing and enforcing selective operations on cloud-based shared content. As an option, one or more variations of fine-grained content selection technique 1B00 or any aspect thereof may be implemented in the context of the architecture and functionality of the embodiments described herein. The fine-grained content selection technique 1B00 or any aspect thereof may be implemented in any environment.

Fine-grained content selection technique 1B00 facilitates selection of the selected hold order content $108_2$ from the cloud-based shared content 102 according to the herein disclosed techniques. Specifically, when the hold order for user u1 and user u2 over time period T1 (input 104) is applied to cloud-based shared content 102, the herein disclosed techniques can use content access events to perform fine-grained hold order content selection that results in selected hold order content $108_2$ (at step 110).

More specifically, the herein disclosed techniques identify the file versions actually accessed, as compared to merely accessible, during the relevant hold order time period pertaining to user u1 and user u2. With this approach, file version v33 of file B, file version v34 of file B, and file version v9 of file D are identified for selected hold order content $108_2$. Certain file versions (e.g., file version v19 of file C and file version v8 of file D) are not included in the selected content since such versions were not accessed by the users associated with the hold order. Also, other file versions outside the bounds of the hold order period (e.g., time period T1) are not included in the selected content.

One embodiment of a system and environment that can facilitate the herein disclosed techniques is shown and described as pertaining to FIG. 2A.

FIG. 2A is a block diagram of a system 2A00 that efficiently enforces hold orders on cloud-based shared content. As an option, one or more variations of system 2A00 or any aspect thereof may be implemented in the context of the architecture and functionality of the embodiments described herein. The system 2A00 or any aspect thereof may be implemented in any environment.

System 2A00 depicts representative users (e.g., user $223_1$, ..., user $223_N$) from a collection of multiple users accessing a set of shared content 222 in a cloud-based content management system. In certain embodiments, access to the storage devices 220 comprising the shared content 222 can be facilitated by one or more instances of a content management server 252. For example, content management server 252 can facilitate access to shared content 222 from various applications (e.g., application $204_1$, ..., application $204_N$) running on multiple user devices (e.g., user device $202_1$, ..., user device $202_N$) such as a desktop computer, a laptop computer, a table computer, a smartphone, a workstation, and/or other computing devices. Such applications can be used to facilitate creating and sharing the shared content 222 among trusted collaborators. For example, a large enterprise with thousands of users (e.g., employees) and many terabytes of content might use a cloud-based content storage platform, such as is represented by system 2A00, to efficiently and securely facilitate content access to various individual users and/or collaborative groups of users.

In some cases, one or more hold orders might be issued that pertain to shared content 222, one or more of the users, and/or other associated entities (e.g., the enterprise of the users). In such cases, according to some embodiments, certain components of system 2A00 can facilitate efficiently enforcing the hold orders on shared content 222 according to the herein disclosed techniques. Specifically, an administrator (e.g., admin 225) can use a management interface 206 to interact (e.g., through a graphical user interface or a text-based or command line user interface) with a policy manager 216 at content management server 252 to establish certain parameters describing a given hold order policy. For example, the file deletion parameters might describe the subject matter, time period, users, user groups, folders, files, file versions, and/or other parameters pertaining to the hold order. In some cases, specific metadata, possibly in the form of key/value pairs, can be used when forming or assigning policy parameters. In some cases, a level of sensitivity of a document, and/or whether or not it has been shared externally, and/or whether or not it has been shared with a specific person or domain, and/or other factors can be used when forming or assigning policy parameters. Such parameters can be stored in policy data 228.

In some cases, policy specifications are codified into respective data items (e.g., using a markup language or data structure), which are in turn stored in a policy data repository. As shown, a first policy 287 might specify a hold policy pertaining to a set of data with an effectivity through a particular first date. A second policy 288 might specify a hold policy pertaining to the same set of data with an effectivity through a particular second date. A third or Nth policy 289 might specify a data retention policy pertaining to the same set of data with an effectivity through a particular Nth date. In some cases, two or more policies might have one or more file deletion conflicts. Strictly as an example, a data retention policy to cause automatic deletion after a certain date or time has expired might specify retention of a set of data through a certain date after which the set of data can be deleted. However, a hold policy other than the aforementioned data retention policy might specify a hold through a date later than the data retention policy date. In such a case of detection of a file deletion conflict or detection of any other sort of policy action conflict, the herein-disclosed techniques are applied so as to adhere to the policy that has a higher priority. Adherence to the policy that has a higher priority can be implemented by a hold order policy manager such as policy manager 216.

As depicted, the policy manager 216 can use a policy type priority data structure 229 to determine the relative priority of actions to be taken in the case that there are multiple in-force policies. In cases when there are multiple in-force policies, it can happen that the action or actions to be taken in accordance with one policy might conflict with the action or actions to be taken in accordance with a different policy. As disclosed herein, the actions to take can be determined after performing a data structure manipulation that is in turn based on the policy type.

In a specific scenario, a first policy type "Retention" might codify a data retention policy of type "Retention", and actions pertaining to that policy type can be associated with a "Low" priority. In the same scenario, a second policy of policy of type "Legal Hold" might codify policy actions (e.g., to deny deletion or modification of any sort through to a particular date and time), and those actions can be associated with a "High" priority. In the same scenario, a third policy might codify its policy actions to be associated with a "Mid" priority. Any of such policy-specific actions that can be taken over an object can be codified as a parameter value that has a specific value syntax and a corresponding meaning. For example, one such parameter value might serve as a file deletion parameter that codifies using a value (e.g., "86") that a "delete" action is to be allowed, and a different value (e.g., "−86") might indicate that a "delete" action is to be disallowed. As yet another example, another policy parameter value might carry the meaning of a file write parameter to indicate that a "write" action is to be allowed.

For determining characteristics of any particular type of policy or hold order and their respective priorities, and for invoking processing steps upon particular events, the policy manager 216 can use the policy data 228 along with any metadata 226 associated with shared content 222 so as to manage the portions of shared content 222 identified as pertaining to one or more policies.

Specifically, policy manager 216 can use access event records 234 to create fine-grained assignments of various types of policies that cover particular sets or items of shared content 222 (e.g., so as to comply with a hold order). In some embodiments, an event listener 212 can detect access events so as to capture the access event records 234 in a set of event data 224 that are then used to create one or more assignments (e.g., to users, folders, files, file versions, etc.) associated with one or more parameters of a given policy. For example, assignments or other associations are used for fine-grained (e.g., file version level) selection of identified content objects 232 pertaining to a given policy. The identified content objects 232 can be marked as being under a hold order using file version records $236_1$ in metadata 226 and/or the identified content objects 232 can be processed in accordance with other data structures to determine applicability and actions pertaining to a hold order over identified content objects 232.

Event listener 212 and a permission service 214 can use such records in metadata 226 to facilitate dynamic management of operations (e.g., delete, move, copy, etc.) pertaining to the identified content objects 232 while the hold order is in force. Specifically, a certain command received from a user might be blocked by permission services based at least in part on certain fields in the file version records $236_1$ indicating the subject file versions are associated with one or more active hold orders. For example, a "delete file X" command might be processed as follows: (1) receive command; (2) check user permissions for executing the command; (3) if permissions allow, check file X metadata for a hold indicator; (4) if there is a hold indicator associated with file X, check the file version records for file X versions with holds; and (5) preserve file X versions with holds while deleting file X versions without holds.

In some situations, users can move a file that is under a hold policy to the trash, however purging from the trash while the policy is in force is disallowed. In another situation, users can manage a file (e.g., delete an object) that is under a policy using an offline synchronization facility (e.g., offline sync), however purging an object from the offline sync facility while the policy is in force is disallowed. More specifically, a user might interact with the offline sync facility to attempt to delete an object or set of objects that are subject to an in-force policy, however, the actual deletion of the object or set of objects is deferred until such time that the policy is no longer in force and/or until any retention period has expired. Various operations can be invoked by users of an offline synchronization facility, and some of those operations cause formation of relationship records that refer to objects managed by the offline synchronization facility.

Any variations of the foregoing offline synchronization facility can operate partially on a user device and partially on the cloud-based storage system. Operations taken either at the cloud-based storage system or at the user device are synchronized so as to be updated (e.g., synchronized) to hold two copies of the same objects and storage containers. The operation or operations invoked by a user (e.g., at a user device) might appear to the invoking user as having been accomplished (e.g., a deletion of an object appears as having been accomplished), however, an object or objects associated with one or more in-force hold orders are held back from policy-violating operations until such time that the hold expires or is lifted. In exemplary embodiments, certain types of object deletion policies override certain other types of object deletion policies (e.g., data retention policies that specify a deletion date or other time- and date-oriented deletion conditions). Moreover, in certain embodiments, derivative content objects (e.g., data that is derived from hold order materials) can be imputed to be associated with a given hold order. For example, such imputed associations can be made based on events detected at event listener 212.

Further details regarding approaches to management of derivative objects are described in U.S. application Ser. No. 15/418,566 titled "MANAGEMENT OF CLOUD-BASED SHARED CONTENT USING PREDICTIVE COST MODELING", filed on Jan. 27, 2017, which is hereby incorporated by reference in its entirety.

Ownership of an object that is held under a policy cannot be transferred to another company ID, except when conditions to certain rules are verified to be present. Strictly as an example, a transfer rule might permit transferring ownership of an object from one corporate entity to another corporate entity only if both corporate entities are covered in the same hold policy. As another example, a transfer rule might disallow transferring ownership of an object from one corporate entity to another corporate entity even if both corporate entities are covered respective entity-specific hold policies.

FIG. 2B1, FIG. 2B2, FIG. 2B3, and FIG. 2B4 are block diagrams of flows. FIG. 2B1, is a block diagram of a setup phase. As shown, step 240 is entered as a consequence of some administrative action such as an administrative action being taken through a user interface. The user interface might capture policy parameters that can be parsed so as to be verified for syntax and validated as for semantics. Once sufficiently verified and validated, a series of data structures (e.g., such as the shown policy type priority data structure 229 of FIG. 2A) and other data structures in a metadata storage repository (e.g., metadata 226 as shown) can be populated for ongoing access by other steps. In particular, at step 241, operations are undertaken to assign a priority to the policy. At step 242, a policy might be codified in one or more data structures. When step 242 is complete, then the effectivity of the policy can be set (step 244), possibly by establishing a setting in metadata.

One possible way to enforce effectivity of the policy includes identification of shared content objects that are covered by the policy (step 245). Another possible way to enforce a policy over shared content is to perform event stream processing over events that pertain to the shared content (step 246). For example, a requested delete operation or move operation over a file or object in a shared content facility might be scrutinized with respect to a policy. The requested operation might be denied, or the requested operation might be performed in the manner as requested, or the requested operation might be performed in a manner that differs from the manner as requested, or the requested operation might be performed together with additional operations such a emitting a log message.

FIG. 2B2 is a block diagram of a flow that efficiently enforces hold orders on cloud-based shared content. The shown block diagram includes event stream processing that commences upon receipt of an event data record 261 that results from a user action. The event data record is preprocessed (at step 262) to codify the event data record into any number of event stream events (e.g., event stream event records $264_1$, event stream event records $264_2$). At step 264, a stream of events are logged into a logging facility that serves to store logged events or other data (e.g., log data 265). The event stream events are forwarded on to other processing steps that listen for events and can apply rules over the events. As used herein, an event stream is a series of one or more access event records that pertain to stored objects and/or one or more administrative actions that pertain to policies.

In some embodiments, an event listener watches discrete incoming events in a stream of events (e.g., comprising all actions taken by any user in the enterprise over any object), determines relevance of the event with respect to storage or policy specifications, and acts on or initiates acts pertaining to the relevant events. For example, when a relevant event is detected, a worker task serves to apply a set of applicable rules such as "block deletion on this file", or "apply hold flag here", or "apply custom metadata value", or "apply a flag". Event listeners can be used to initiate processing of various types of filters, rules, and worker processes. Strictly as further examples, a worker process could be created so as to initiate an approval action to be taken after a file is moved to an approvals folder (e.g., listen for the "move" event, trigger "task", "apply a rule or flag", etc.). Folder security can be tightened as edits are made by certain users (e.g., certain users having higher privileges). A worker task can also listen for events and take action based on the occurrence and detection of a particular event over the shared object storage (e.g., a change in secure sharing settings) and/or a worker task can listen for events and take action based on the occurrence and detection of a particular event over a hold order itself (e.g., an event to add another user, an event to expand coverage to additional folders, files, etc.). Such events can occur and be processed at any moment in time when there are covered objects and/or at any moment in time when there is a hold order—whether or not there are any covered objects at that particular moment in time.

As shown at step 266, a rule manager 270 processes rules over the events. A rules base 267 comprises filters 268 and queries 269. Filters are used to determine if an event is subject to consideration as pertaining to a policy. In some embodiments, queries can be used to determine whether or not an event is subject to consideration as pertaining to a particular policy, and whether or not the event meets sufficient Booleans or thresholds so as to be considered a candidate for further checking or processing. When an event is determined to be both subject to consideration as pertaining to a policy and also meets sufficient Booleans or thresholds so as to be considered a candidate, then at step 272 candidate events (e.g., candidate event 271$_1$, candidate event 271$_2$) are processed against a set of codified policies.

In some cases, a single event might be covered by multiple policies, and in some cases the policies might be in conflict. For example, an event to delete a file (e.g., due to an event raised by a retention policy process) might correspond to a particular retention policy which, by itself, would properly permit deletion of the file at this juncture. However, it is possible that another policy, possibly of a higher priority than the data retention policy, might be in effect so as to place a hold on a deletion action and/or other destructive actions that might be taken pursuant to incoming events. In such cases (e.g., when multiple policies are detected), a series of checks for policy conflicts are performed (e.g., at step 273, as shown). In the event that action conflicts are detected between the actions of the multiple policies, then such conflicts are resolved based on relative policy type priorities that control the determination of actions to be performed (or not performed) even when there are conflicts. Resolution to take an action might result from processing within step 273. As an example, if a first one of the aforementioned multiple policies pertains a data retention policy type that is associated with a "Low" priority, and if a second one of the multiple policies pertains to a legal hold policy that is associated with a "High" priority, then the considered (but not yet performed) actions pertaining to a legal hold policy of "High" would "win" and its applicable action or actions, or denial of action or actions (if any) are prioritized over the action or actions of the lower priority data retention policy.

After conflict resolution, if the event is deemed to be actionable based on one or more policies (see the "Yes" branch of decision 274), then (at step 275), the flow initiates one or more actions based on the specific properties of the candidate event and policy parameters that are derived from any number of applicable hold orders. If the event is deemed to not be actionable, then the "No" branch of decision 274 is taken and the action or actions of step 275 are not executed. Further details pertaining to a technique for determining action priorities are shown and described as pertains to FIG. 2B3.

Figure 3:
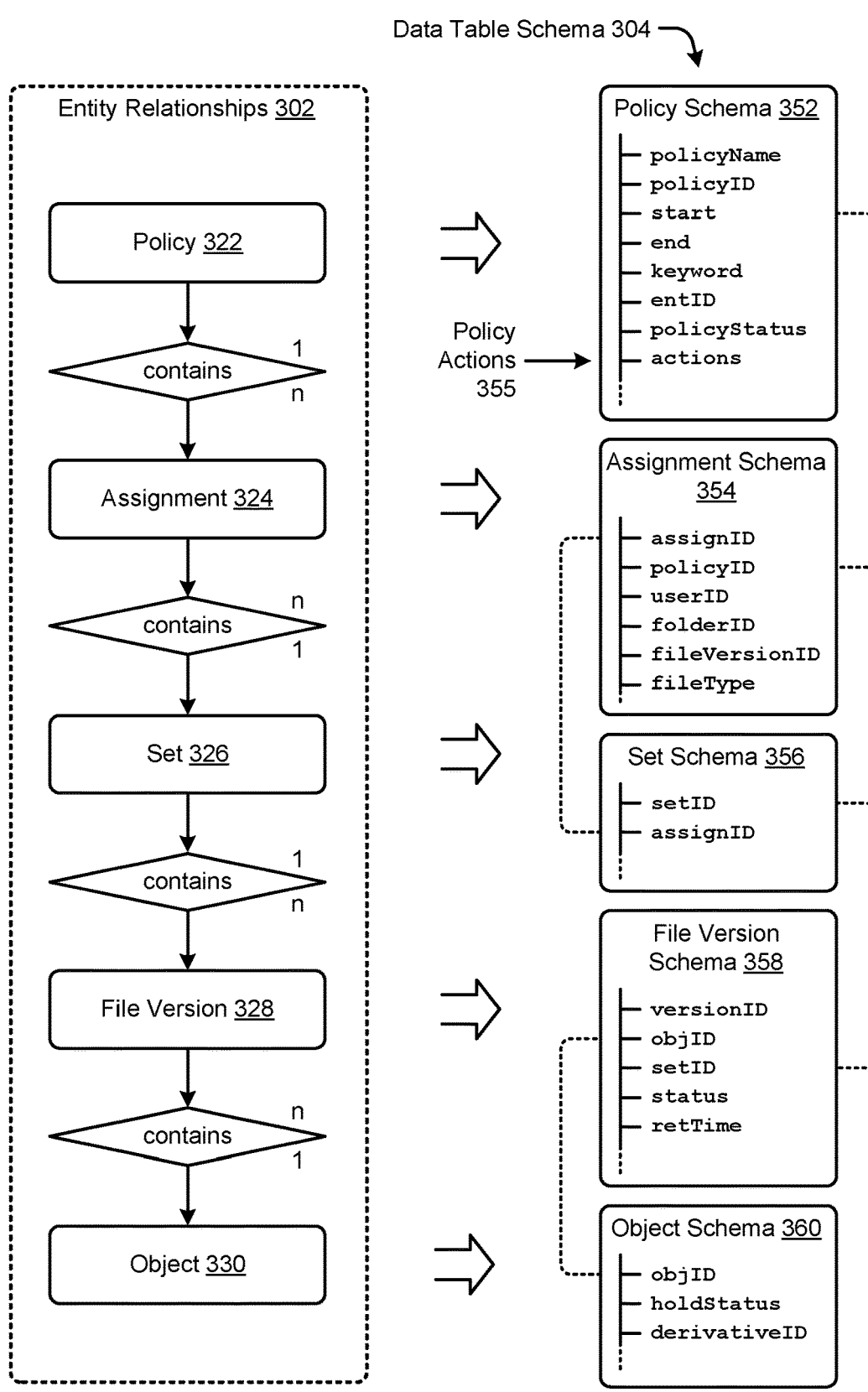

FIG. 2B3 depicts a table-oriented technique 2B300 for resolving actions when conflicting actions arise from multiple concurrently in-force policies.

The interactions between policies and respective actions to be taken might be complex. In many cases an action or actions to be taken in accordance with the then-current application of a first policy might be in conflict with actions to be taken in accordance with an action or actions of a second policy. Such interactions might become still more complex when considering the applicability of a particular action on a particular object. As such, conflicts are to be resolved at a fine-grained level, including down to the time-object-action level of granularity. However, logic covering time-object-action level of granularity can become unwieldy, thus high-performance techniques are disclosed hereunder to improve efficiency when determining actions to take over an object.

As shown, this embodiment of step 273 initially populates columns of a data structure with an "Object" column and as many "Action" columns as there are then-currently in-force policies that apply to a particular subject object. Upon determination of the set of then-currently in-force policies, (step 290), the performance of the operations of step 291, including iterations via loop 292, can result in a column-oriented data structure such as the shown populated conflict resolution table 295. In exemplary cases, the specific policies being considered are those in-force policies having policy-specific actions to take for the particular subject object.

When all particular in-force policies that at least potentially pertain to the particular subject object have been identified, the ordering of the action columns can be determined. In some cases, the technique for identifying in-force policies might collect in-force policies in an arbitrary order. As such, additional steps are taken to perform as many column ordering operations 296 as are needed to order the columns by policy priority. Step 291 serves to determine a prioritized order for columns of the data structure. As many action columns are populated as there are particular in-force policies at least potentially pertaining to the particular subject object. Also, as many column ordering operations 296 as are needed are undertaken to produce an ordered set of columns of a prioritized conflict resolution table 297.

The shown reordering operations are presented strictly for illustration. Any known technique can be used to construct the data structure and mark, move, tag or otherwise prioritize. Additionally, when populating the columns of the earlier-determined set of in-force policies, respective policy actions are populated into the columns of the prioritized conflict resolution table using any known technique. As one example, a particular action taken from a particular policy that pertains to the subject object are added as an entry into the action column and row pertaining to that particular subject object and policy.

Processing continues at step 293, which serves to determine whether or not conflicts exist between the policy-specific actions to take for each in-force policy over a particular subject object. In the event of a conflict between actions, the action in the column that is determined to pertain to the highest priority policy becomes the action to take. In this example, in accordance with the aforementioned conflict resolution technique, the rows of the prioritized conflict resolution table are iterated over to either process or initiate processing of actions that are prioritized based on occurrence in a higher-ordered column.

Continuing this example, as shown in the first row of prioritized conflict resolution table 297, the "P2 Action" over folder "F33" is "delete" and the "P1 Action" over folder "F33" is also "delete". Step 293 determines that there is no conflict. Continuing to the second row, the "P2 Action" of this row is "deny delete", whereas the "P3 Action" is "delete". Step 293 determines the existence of a conflict and chooses the action "deny delete", which is the action in the higher-ordered column. In the third row, the "P1 Action" indicates "write to log", and the "P3 Action" is "deny delete". Step 293 determines there is no conflict. Both the action "write to log" and the action "deny delete" can be taken.

In this embodiment, the set of actions taken from higher-ordered columns are collected at step 294. The set of actions are assembled and processed by further logic. More specifically, the resulting set of actions from the performance of step 273 might be further considered by ongoing processing such as is shown in decision 274 and step 275 of FIG. 2B2.

Any of the collected policy actions resulting from the performance of step 290 through step 294 might be further considered with respect to the particular event that precipitated the consideration of the policy over the object. Strictly as one example, further consideration of an event might be taken with respect to additional event rules.

Further details regarding approaches to processing of events and application of rules over the events using event criteria are described in U.S. application Ser. No. 14/026,674 titled "CONFIGURABLE EVENT-BASED AUTOMATION ARCHITECTURE FOR CLOUD-BASED COLLABORATION PLATFORMS", filed on Sep. 13, 2013, which is hereby incorporated by reference in its entirety.

FIG. 2B4 is a block diagram of a takedown phase. As shown, step 280 is entered as a consequence of some administrative action such as an administrative command being invoked through a user interface. The user interface might allow modification and/or deletion and/or removal of policy parameters. The provenance of any administrative action can be checked as for authentication and authorization. Further, parameters and/or semantics pertaining to authenticated and authorized administrative actions can be parsed so as to be verified for syntax and validated as for semantics. When authentication, authorization, verification, and validation have completed, the metadata storage can be modified to reflect the nature of the administrative action (step 282). In some cases of a takedown, metadata is cleaned-up and/or deleted (step 284). In some cases of a takedown, metadata is purged from any locations in any caches. In yet other cases of a takedown, metadata pertaining to derivative objects is cleaned-up and/or deleted (step 285).

FIG. 3 is a diagrammatic representation of data structures 300 used in systems for efficiently establishing and enforcing selective operations on cloud-based shared content. As an option, one or more variations of data structures 300 or any aspect thereof may be implemented in the context of the architecture and functionality of the embodiments described herein. The data structures 300 or any aspect thereof may be implemented in any environment.

FIG. 3 depicts example instances of entity relationships 302 and associated data table schema 304 used in systems for efficiently establishing and enforcing selective operations on cloud-based shared content. Other relationships and/or information are possible. Specifically, entity relationships 302 show that a given hold order "Policy" entity (policy 322) can have a one-to-many (e.g., 1:n) relationship with an "Assignment" (assignment 324) that is codified as a data structure (e.g., a table) which can, in turn, have a many-to-one (e.g., n:1) relationship with a "Set" entity (set 326). For example, one hold order policy (e.g., pertaining to product Z in company ABC) might have multiple assignments for each of the users in company ABC related to product Z, and various combinations of assignments can comprise a particular set. Also, a given "Set" can have a one-to-many relationship with a "File" or "File Version" or other sort of stored object entity such as a file version 328.

For example, multiple file versions shared by a group of collaborators assigned to the hold order under a certain set (e.g., comprising the assignments of the collaborators) can be associated with that set. Furthermore, in some embodiments, file versions can have a many-to-one relationship with any sort of stored object (object 330). For example, a file or file version might include content that references another location that in turn stores an object such as a photograph, or a resource referenced by a uniform resource identifier (URI). In other embodiments, file versions can have a many-to-many relationship with "Objects". For example, one content object be referred to by multiple file versions. As another example, a file version might refer to derivative objects.

The foregoing entities can use various data structures to organize data records used by the herein disclosed techniques to efficiently enforce hold orders on cloud-based shared content. In certain embodiments, relational data tables (e.g., stored in metadata) structured with the data table schema 304 shown can be implemented. Other data structures are possible. Specifically, the policy entity (policy 322) might be described by a data table having a policy schema 352. A policy schema 352 can be realized in a table having columns associated with a policy name or policyName, a policy identifier or policyID, a policy start time or start, a policy persistence (e.g., ongoing policy or "no end time"), or date specification of an end time or end, one more subject matter keywords or keyword, an enterprise identifier or entID, a policy status or policyStatus, an action or set of policy actions 355, and/or other attributes. For example, policyStatus might be used to handle certain conditions when adding and/or deleting policies and/or assignments. As another example, codification of the actions might include an action that is acted upon only when a Boolean test evaluates to TRUE. A policy action refers to any computing system operation that is capable of being performed over any object in the computing system. Policy actions are often associated with a Boolean test or tests to determine if and when a particular action is to be allowed and/or to determine if and when a particular action is to be denied.

The assignment entity (assignment 324) might be described by a data table having an assignment schema 354. Assignment schema 354 can specify a table having columns associated with an assignment identifier or assignID, policy identifier or policyID, a user identifier or userID, a folder identifier or folderID, a file type or fileType, a file version of fileVersionID, and/or other attributes. The set entity (set 326) might be described by a data table having a set schema 356. Set schema 356 can specify a table having columns associated with a set identifier or set ID, an assignment identifier or assignID, and/or other attributes. The file version 328 might be described using a data table conforming to a file version or file version schema 358. File version schema 358 can specify a table having columns associated with a version identifier or versionID, an object identifier or objID, a set identifier or set ID, a hold status indicator or status, a data retention policy expiration or retTime, and/or other attributes. Logical combinations of the values in the columns of the aforementioned table result in an indication that the retention time has expired, and the object corresponding to the fileVersionID is "OK to delete". In certain exemplary cases, a date or expiration period is codified into the retention policy and such a date or expiration period is used to form an "OK to delete" indication. In other exemplary cases, a date or expiration period is codified into a legal hold or other hold policy and such a date or expiration period is used to form a "Do not delete" indication.

Further, the object entity (object 330) might be described by a data table having an object schema 360. Object schema 360 can specify a table having columns associated with an object identifier or objID, a hold status indicator or holdStatus pertaining to the object, and/or a hold status indicator pertaining to a derivative of an object identified by derivative ID of a particular derivative object. Such a schema can include other attributes that can be used for a range of purposes. For example, the object table using the object schema 360 can facilitate a quick check of the hold order status of a given object. In some cases attributes that pertain to set or assignment entities can be stored wholly in a data item corresponding to file version schema 358. In some cases, attributes that pertain to set or assignment entities can be stored partially in the form of object schema 360 and partially in the form of file version schema 358. The determination as to where to store attributes that pertain to set or assignment entities can be made a priori (e.g., based on convenience or design choices) and/or the decision as to where to store the attributes can be made dynamically (e.g., based on then-current performance metrics). The foregoing entity relationships and data structures can facilitate efficient implementation of hold orders on cloud-based shared content as shown and described infra.

FIG. 4A1 depicts a hold order implementation technique 4A100 as used in systems for efficiently establishing and enforcing selective operations on cloud-based shared content. As an option, one or more variations of hold order implementation technique 4A100 or any aspect thereof may be implemented in the context of the architecture and functionality of the embodiments described herein. The hold order implementation technique 4A100 or any aspect thereof may be implemented in any environment.

The hold order implementation technique 4A100 presents one embodiment of certain steps for implementing a hold order (e.g., described by file deletion parameters) on cloud-based shared content using the herein disclosed techniques. In one or more embodiments, the steps and underlying operations comprising hold order implementation technique 4A100 can be executed by a policy manager, such as policy manager 216 in system 2A00 as shown and described pertaining to FIG. 2A.

Specifically, the hold order implementation technique 4A100 can commence with the policy manager receiving the policy parameters (at step 402). One or more assignments can be created from the received policy parameters (at step 404). For example, an assignment for each of the users pertaining to the hold order might be created. In some cases, assignments pertaining to a time period and/or a subject matter keyword might be created. Such keywords might be converted to n-grams that can be used to identify content associated with the subject matter using various known n-gram search techniques.

For each assignment created, the corpus of shared content can be scanned to identify the file versions associated with the assignment (at step 406). Each file version identified can then be analyzed as given in the following descriptions.

If the file version is not already on a hold (see "No" path of decision 408), then a file version record can be created (at step 410). If a set associated with the assignment does not exist (see "No" path of decision 412), then a set comprising the assignment can be created (at step 414). If a set associated with the assignment exists (see "Yes" path of decision 412) or one has been created (at step 414), then the file version record can be updated to point to the set (at step 416).

If the file version is on hold order due to another assignment (see "Yes" path of decision 408), then the then-current set associated with the file version record can be identified (at step 418) and a new set comprising the assignment and the items of the then-current set can be created (at step 420). The file version record can then be updated to point to the new set (at step 422). When all assignments and file versions pertaining to the hold order policy are processed, the transaction can be closed to complete the hold implementation (operation 430).

FIG. 4A2 illustrates a hold order implementation flow 4A200 as used in systems for efficiently establishing and enforcing selective operations on cloud-based shared content. As an option, one or more variations of hold order implementation flow 4A200 or any aspect thereof may be implemented in the context of the architecture and functionality of the embodiments described herein. The hold order implementation flow 4A200 or any aspect thereof may be implemented in any environment.

FIG. 4A2 presents various representative structures illustrating the hold implementation (operation 430) earlier described. Specifically, a hold order policy 432 might be implemented that generates a set of assignments 434 (e.g., $A_1$ and $A_2$) associated with two users (e.g., u1 and u2, respectively). Using the herein disclosed techniques to implement the hold order policy 432, a certain collection of sets 436 can be created. For example, a set $S_1$ comprising assignment $A_1$, and a set $S_3$ comprising assignment $A_1$ and assignment $A_2$ might be created. The foregoing sets can be used in a set of file version records $236_2$ to characterize the one or more hold orders associated with a given file version. For example, as shown, file version Bv33 (e.g., version v33 of file B) and file version Bv34 are associated with set $S_1$ (e.g., S1), and file version Dv9 is associated with set $S_3$ (e.g., S3). To facilitate low latency determination of a hold order status for a given object, a set of object records 440 can show a holdStatus for each object associated with a file version in the file version records $236_2$. Specifically, file B and file D are shown as being on hold.

FIG. 4B1 depicts an assignment removal technique 4B100 as used in systems for efficiently establishing and enforcing selective operations on cloud-based shared content. As an option, one or more variations of assignment removal technique 4B100 or any aspect thereof may be implemented in the context of the architecture and functionality of the embodiments described herein. The assignment removal technique 4B100 or any aspect thereof may be implemented in any environment.

The assignment removal technique 4B100 presents one embodiment of certain steps for removing one or more assignments associated with a hold order on cloud-based shared content using the herein disclosed techniques. For example, a particular hold order might be lifted to invoke removal of all the particular assignments associated with that particular hold order. As another example, a portion of the assignments associated with a hold order might be removed precipitated by an exclusion of one or more users from a given hold order. As yet another example, if all of the assignments pertaining to a particular hold order have been removed, the hold order policy can remain in force in principle, even though there remain no users, folders, files, file versions, or file objects that are affected by the hold order.

A hold can be ended in many ways, for example, by an explicit release (see FIG. 5B) or by termination of the hold, etc. A hold can be ended upon an event, for example, upon release of a particular enterprise (e.g., based on release or deletion of an ent ID) from the hold. Moreover, a hold can be extended in many ways, for example, by an explicit addition or modification of attributes of the hold that extend to the scope or timeframe of the hold.

In one or more embodiments, the steps and underlying operations comprising assignment removal technique 4B100 can be executed by a policy manager, such as policy manager 216 in system 2A00 as shown and described pertaining to FIG. 2A. Specifically, for each assignment identified for deletion, the assignment removal technique 4B100 can commence with transitioning the assignment to a deleting state (at step 442). For example, marking the assignment as being in a deleting state can facilitate processing when adding and/or deleting assignments. The sets associated with the assignment can also be determined (at step 444). For each of the sets associated with the assignment, a particular set can be analyzed to determine if the set is associated with multiple assignments (at decision 446). If the set comprises multiple assignments (see "Yes" path of decision 446), a modified set can be determined by removing the assignment identified for deletion from the set (at step 448). If the modified set does not exist (see "No" path of decision 450), a new set can be created from the modified set (at step 452). If the modified set exists (see "Yes" path of decision 450) or a new set is created, the file version records can be updated to point to the existing modified set or the new set (at step 454).

In some cases, the set associated with the assignment identified for deletion might merely comprise that assignment (see "No" path of decision 446). In such cases, the set can be deleted (at step 456), and the hold can be removed from the file version records associated with the set and assignment (at step 458). In some cases, the file version records having a hold that was lifted can be checked by the data retention policy manager for appropriate action (at step 460). For example, some file versions lifted from a hold order after a long period of time may be subject to deletion based at least in part on a data retention policy. When all assignments identified for deletion are processed, the assignment removal can be completed (operation 470).

FIG. 4B2 illustrates an assignment removal flow 4B200 as used in systems for efficiently establishing and enforcing selective operations on cloud-based shared content. As an option, one or more variations of assignment removal flow 4B200 or any aspect thereof may be implemented in the context of the architecture and functionality of the embodiments described herein. The assignment removal flow 4B200 or any aspect thereof may be implemented in any environment.

FIG. 4B2 presents various representative structures illustrating the assignment removal (operation 470) earlier described. Specifically, a release of user u1 from a hold order (operation 462) might precipitate removal of assignment $A_1$. Using the herein disclosed techniques, set $S_1$ comprising merely assignment $A_1$ can be removed (e.g., becomes an empty set). Also, assignment $A_1$ can be removed from set $S_3$ to create a new set $S_2$ comprising assignment $A_2$. The foregoing set changes can then be applied to the shown instance of the file version records $236_3$. Specifically, the hold can be lifted from Bv33 and Bv34 by removing a set entry from the setID field and changing the status to free. Also, the setID for Dv9 can be updated to S2. Since the data retention time for Bv34 has expired (e.g., retTime=Y), that file version can be deleted at the next retention check (operation 464). The setID field can hold values or flags (e.g., negative values) other than a set identification value. In some cases the flag can indicate that there is no hold order on any of the objects pertaining to that entry. Such flags can be present in a file version record or can be present in any other data structure accessible by a query.

Figure 5A:
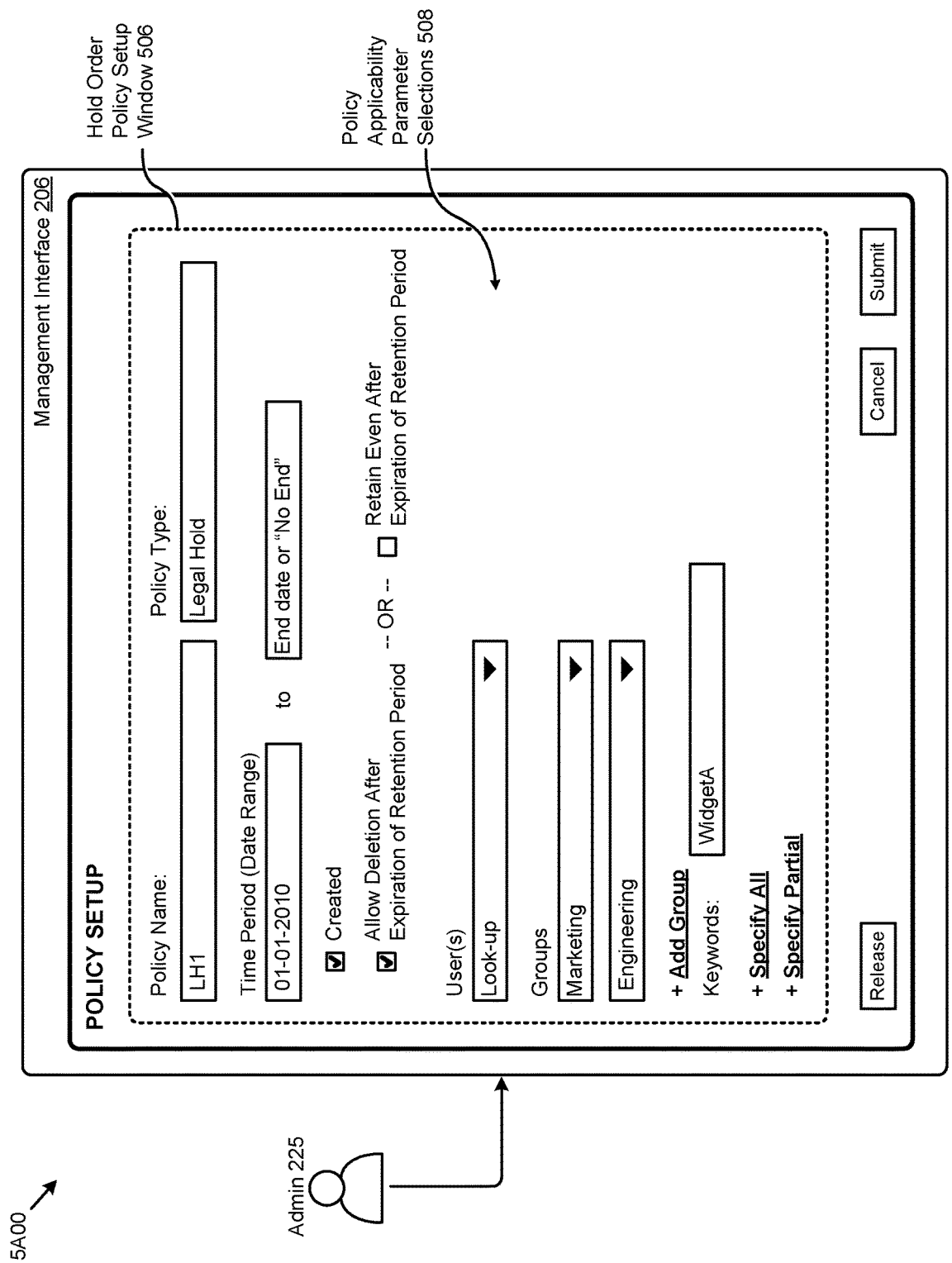
FIG. 5A presents a user interface for specifying object deletion policies in systems for efficiently establishing and enforcing selective operations on cloud-based shared content, according to an embodiment.

FIG. 5A presents a user interface 5A00 for specifying object deletion policies in systems for efficiently establishing and enforcing selective operations on cloud-based shared content. As an option, one or more variations of user interface 5A00 or any aspect thereof may be implemented in the context of the architecture and functionality of the embodiments described herein. The user interface 5A00 or any aspect thereof may be implemented in any environment.

Specifically, the user interface 5A00 shown in FIG. 5A can be used by a user or an administrator (e.g., admin 225) to specify certain parameters describing a hold order policy. More specifically, user interface 5A00 can comprise a hold order policy setup window 506 that can be presented to admin 225 in management interface 206. As shown, the hold order policy setup window 506 can present various input entry elements (e.g., dropdown selections, text boxes, etc.) through which admin 225 can make various policy applicability parameter selections 508 for a given policy. Such parameters can be used by the herein disclosed techniques for efficiently establishing and enforcing selective operations on cloud-based shared content.

For example, admin 225 can specify a "Policy Name" (e.g., LH1) and "Time Period" associated with the hold order policy. In some embodiments, the time period might pertain to when certain file versions and/or content objects are "Created" and/or "Uploaded". Admin 225 can further specify one or more "Groups" associated with the hold order (e.g., Marketing, Engineering, etc.). Such groups might be mapped to a set of users for which assignments can be created. One or more keywords (e.g., "WidgetA") might further be specified to describe the subject matter pertaining to the hold order. Such keywords might be converted to n-grams that can be used to identify content associated with the subject matter using various known n-gram search techniques.

An administrator can specify that the hold order policy is to apply to only portions of a storage container (e.g., a portion of a sub-hierarchy in a container hierarchy, a portion of files in a storage container, etc.). For example, a screen device "Specify Partial" can be manipulated by an admin so as to specify that only a portion of a folder (e.g., a selected subset of files or other objects) is to be subjected to the hold. An administrator can specify that the hold order policy is to apply to all members of a hierarchy. For example, a screen device "Specify All" can be manipulated by an admin so as to specify that all members of the "Marketing" and "Engineering" groups are to be subjected to the hold.

In some embodiments, a "Policy Type" corresponding to the "Policy Name" can be specified. The value of the "Policy Type" can correlate, for example, to any of the policy types given in the aforementioned policy type priority data structure 229.

Figure 5B:
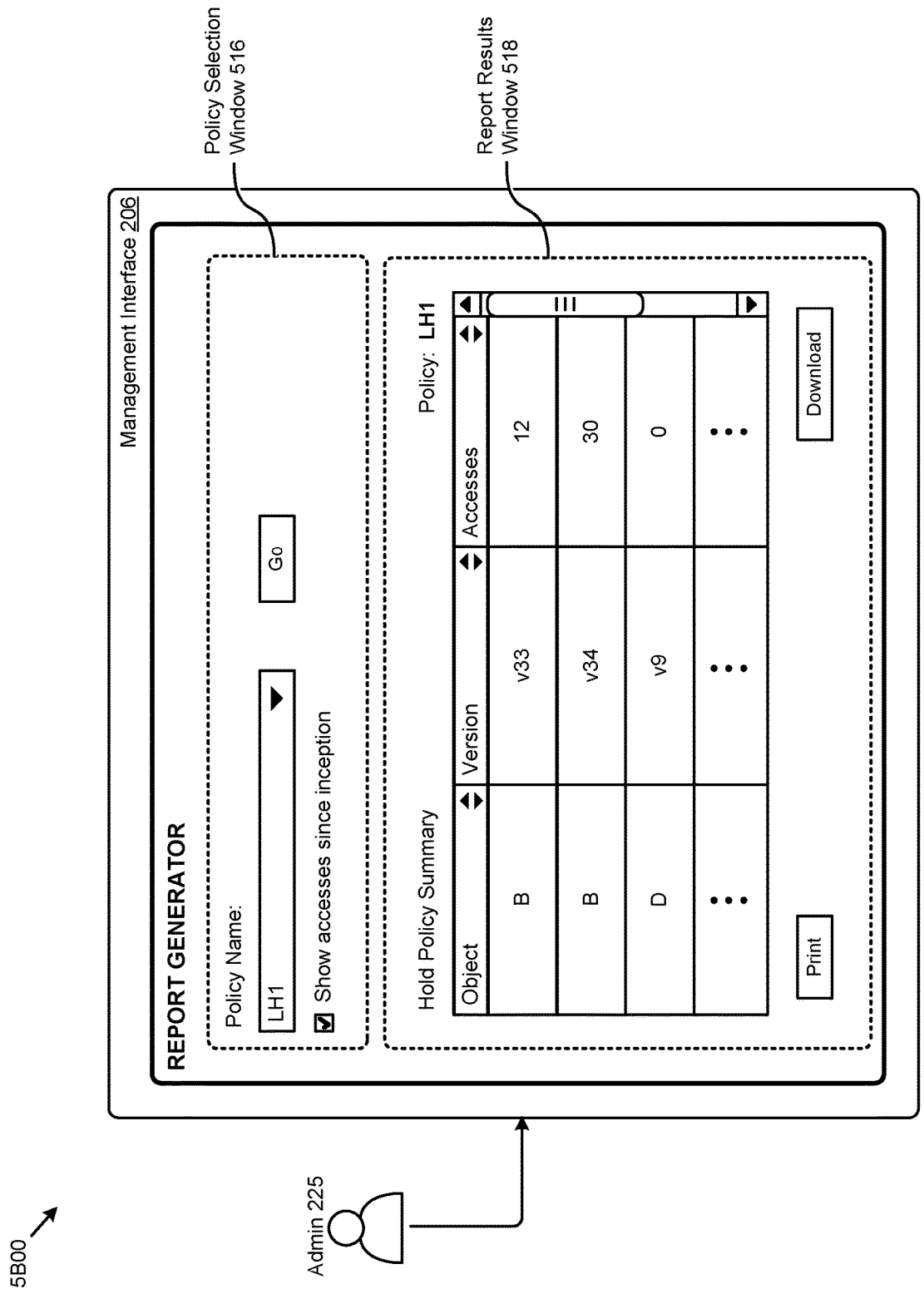
FIG. 5B presents a report generation interface for generating reports pertaining to object deletion policies in systems for efficiently establishing and enforcing selective operations on cloud-based shared content, according to an embodiment.

FIG. 5B presents a report generation interface 5B00 for generating reports pertaining to object deletion policies in systems for efficiently establishing and enforcing selective operations on cloud-based shared content. As an option, one or more variations of report generation interface 5B00 or any aspect thereof may be implemented in the context of the architecture and functionality of the embodiments described herein. The report generation interface 5B00 or any aspect thereof may be implemented in any environment.

In some embodiments, a report of the file versions and/or other characteristics of the content associated with a given hold order can be generated. Specifically, the report generation interface 5B00 shown in FIG. 5B can be used by a user or an administrator (e.g., admin 225) to generate reports comprising the file versions and/or other characteristics of the content associated with a given hold order. More specifically, report generation interface 5B00 can comprise a policy selection window 516 that can be presented to admin 225 in management interface 206. As shown, the policy selection window 516 can present various input entry elements (e.g., dropdown selections, text boxes, etc.) through which admin 225 can select a "Policy" (e.g., LH1) for which a report can be generated (e.g., by clicking "Go" button). In some embodiments, various metrics associated with the policy, such as "Show accesses since inception" of the hold order, can be calculated and presented in the report results. In the report results window 518, the list of file versions associated with the hold order can be presented. For example, the "Object", "Version", "Accesses", and/or other attributes of each file version can be presented. The reported results can be downloaded (e.g., in Excel or PDF format) and/or printed.

Additional Embodiments of the Disclosure

Additional Practical Application Examples

Figure 6:
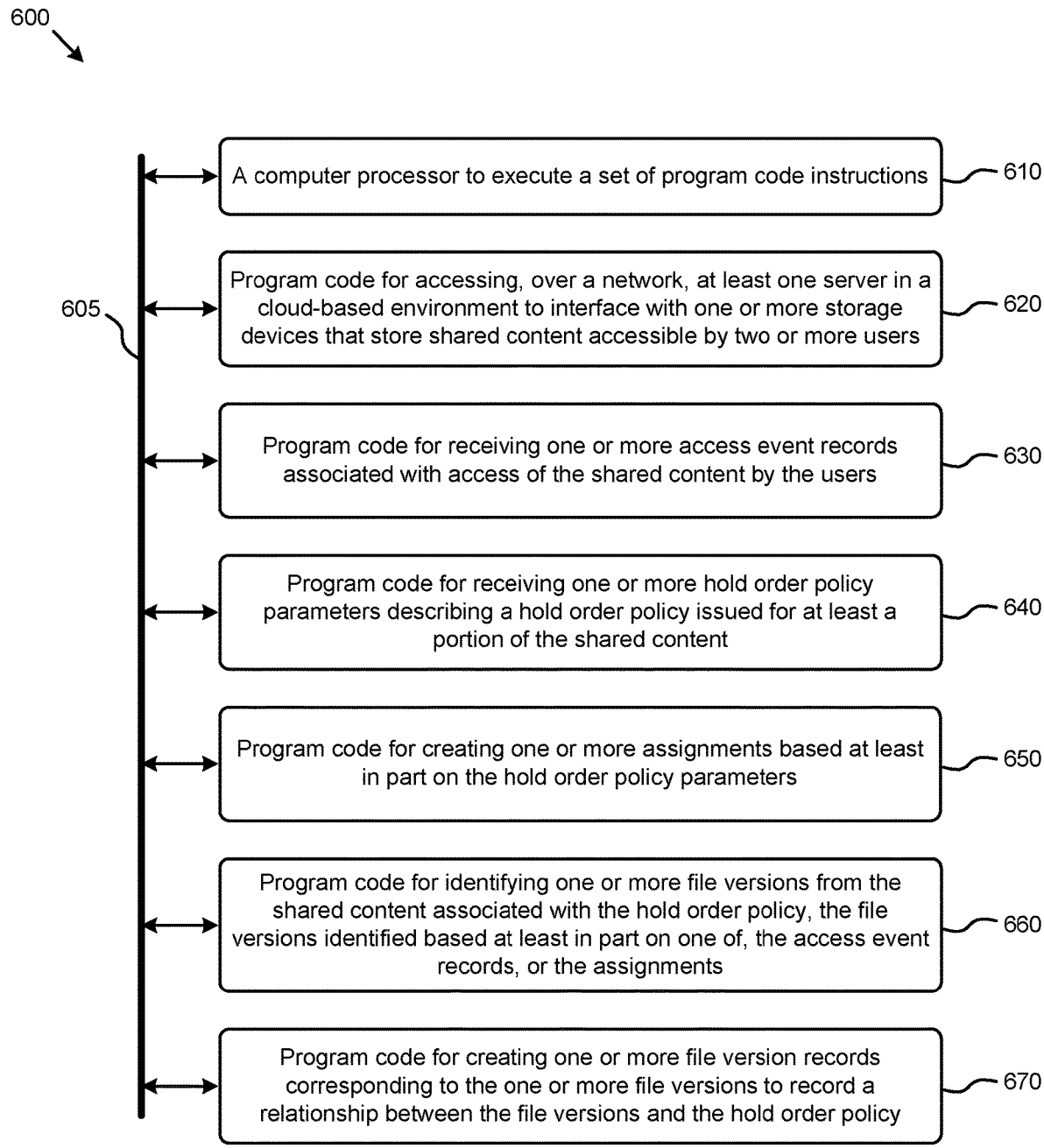
FIG. 6 depicts system components as arrangements of computing modules that are interconnected so as to implement certain of the herein-disclosed embodiments.

FIG. 6 depicts a system 600 as an arrangement of computing modules that are interconnected so as to operate cooperatively to implement certain of the herein-disclosed embodiments. The partitioning of system 600 is merely illustrative and other partitions are possible. As an option, the system 600 may be implemented in the context of the architecture and functionality of the embodiments described herein. Of course, however, the system 600 or any operation therein may be carried out in any desired environment.

The system 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with other operations over communication path 605. The modules of the system can, individually or in combination, perform method operations within system 600. Any operations performed within system 600 may be performed in any order unless as may be specified in the claims.

The shown embodiment implements a portion of a computer system, presented as system 600, comprising a computer processor to execute a set of program code instructions (module 610) and modules for accessing memory to hold program code instructions to perform: accessing, over a network, at least one server in a cloud-based environment to interface with one or more storage devices that store shared content accessible by two or more users (module 620); receiving one or more access event records associated with access of the shared content by the users (module 630); receiving one or more hold order policy parameters describing a hold order policy issued for at least a portion of the shared content (module 640); creating one or more assignments based at least in part on the hold order policy parameters (module 650); identifying one or more file versions from the shared content associated with the hold order policy, the file versions identified based at least in part on one of, the access event records, or the assignments (module 660); and creating one or more file version records corresponding to the one or more file versions to record a relationship between the file versions and the hold order policy (module 670).

Variations of the foregoing may include more or fewer of the shown modules and variations may perform more or fewer (or different) steps, and/or may use data elements in more, or in fewer (or different) operations.

Some embodiments further comprise creating one or more sets comprising at least one of the assignments.

Some embodiments include variations where a set identifier is used in the file version records to record the relationship between the file versions and the hold order policy.

Some embodiments further comprise removing at least one set responsive to removing one or more of the assignments.

Some embodiments further comprise modifying at least one set responsive to removing one or more of the assignments.

Some embodiments include variations where the file deletion parameters comprise at least one of, a policy name, a policy identifier, a policy start time (or content creation/modification/access), a policy end time (or content creation/modification/access), and/or one or more subject matter keywords, an enterprise identifier, or a policy status.

Some embodiments include variations where at least one of the assignments is based at least in part on one of, a user, a folder, a file version, a file type, a store object, a storage container, or a portion of objects in a storage container.

Some embodiments further comprise generating a report comprising at least the file versions.

Some embodiments further comprise presenting a user interface to at least one of the users to specify at least one of the file deletion parameters.

System Architecture Overview

Additional System Architecture Examples

Figure 7A:
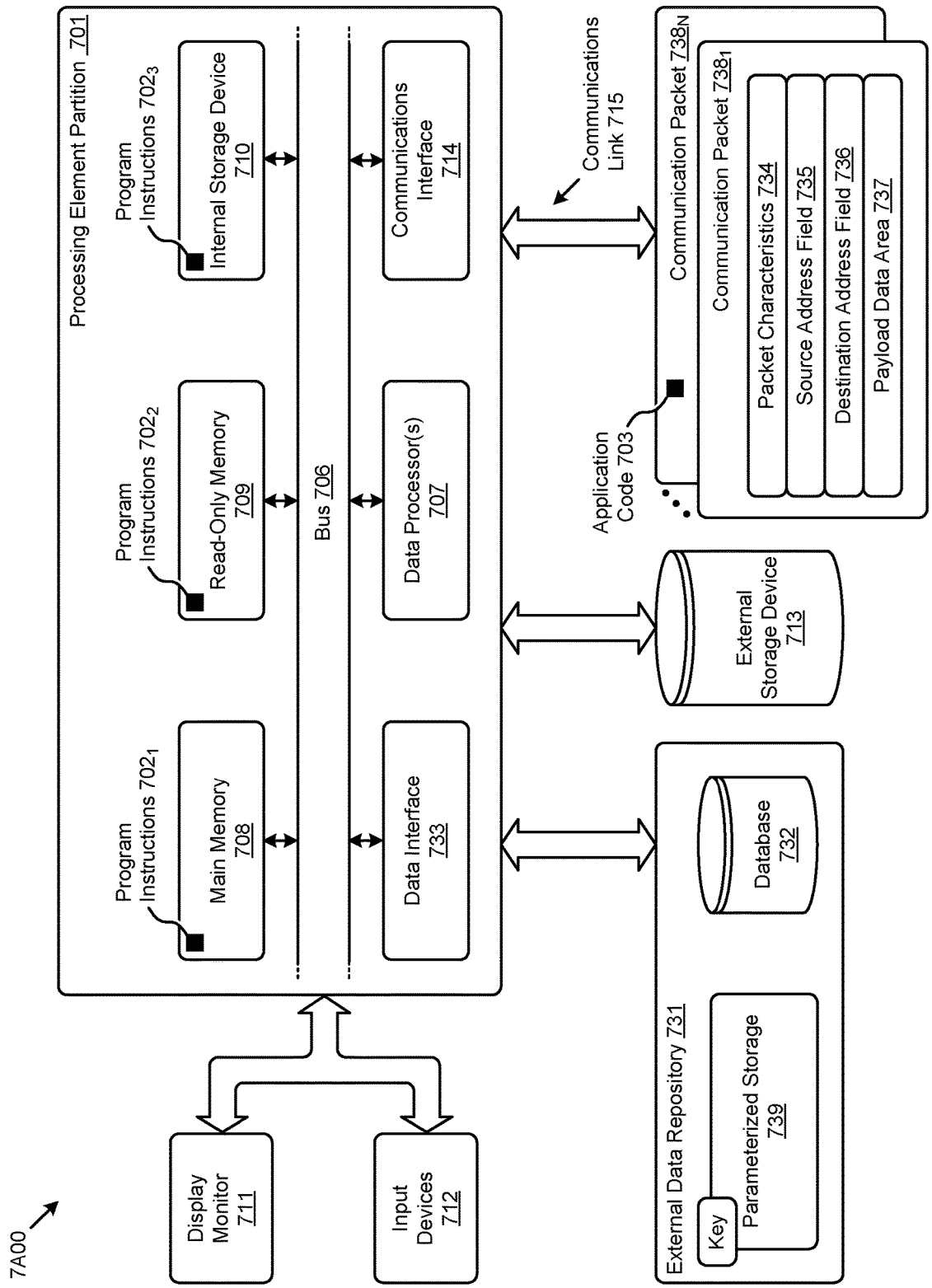
FIG. 7A and FIG. 7B present block diagrams of computer system architectures having components suitable for implementing embodiments of the present disclosure, and/or for use in the herein-described environments.

FIG. 7A depicts a block diagram of an instance of a computer system 7A00 suitable for implementing embodiments of the present disclosure. Computer system 7A00 includes a bus 706 or other communication mechanism for communicating information. The bus interconnects subsystems and devices such as a central processing unit (CPU), or a multi-core CPU (e.g., data processor 707), a system memory (e.g., main memory 708, or an area of random access memory (RAM)), a non-volatile storage device or non-volatile storage area (e.g., read-only memory 709), an internal storage device 710 or external storage device 713 (e.g., magnetic or optical), a data interface 733, a communications interface 714 (e.g., PHY, MAC, Ethernet interface, modem, etc.). The aforementioned components are shown within processing element partition 701, however other partitions are possible. The shown computer system 7A00 further comprises a display 711 (e.g., CRT or LCD), various input devices 712 (e.g., keyboard, cursor control), and an external data repository 731.

According to an embodiment of the disclosure, computer system 7A00 performs specific operations by data processor 707 executing one or more sequences of one or more program code instructions contained in a memory. Such instructions (e.g., program instructions $702_1$, program instructions $702_2$, program instructions $702_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 7A00 performs specific networking operations using one or more instances of communications interface 714. Instances of the communications interface 714 may comprise one or more networking ports that are configurable (e.g., pertaining to speed, protocol, physical layer characteristics, media access characteristics, etc.) and any particular instance of the communications interface 714 or port thereto can be configured differently from any other particular instance. Portions of a communication protocol can be carried out in whole or in part by any instance of the communications interface 714, and data (e.g., packets, data structures, bit fields, etc.) can be positioned in storage locations within communications interface 714, or within system memory, and such data can be accessed (e.g., using random access addressing, or using direct memory access DMA, etc.) by devices such as data processor 707.

The communications link 715 can be configured to transmit (e.g., send, receive, signal, etc.) any types of communications packets (e.g., communications packets $738_1, \ldots,$ communications packets $738_N$) comprising any organization of data items. The data items can comprise a payload data area 737, a destination address 736 (e.g., a destination IP address), a source address 735 (e.g., a source IP address), and can include various encodings or formatting of bit fields to populate the shown packet characteristics 734. In some cases the packet characteristics include a version identifier, a packet or payload length, a traffic class, a flow label, etc. In some cases the payload data area 737 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 707 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 731, which in turn can be formatted into any one or more storage areas, and which can comprise parameterized storage 739 accessible by a key (e.g., filename, table name, block address, offset address, etc.).

Execution of the sequences of instructions to practice certain embodiments of the disclosure are performed by a single instance of the computer system 7A00. According to certain embodiments of the disclosure, two or more instances of computer system 7A00 coupled by a communications link 715 (e.g., LAN, public switched telephone network, or wireless network) may perform the sequence of instructions required to practice embodiments of the disclosure using two or more instances of components of computer system 7A00.

The computer system 7A00 may transmit and receive messages such as data and/or instructions organized into a data structure (e.g., communications packets). The data structure can include program instructions (e.g., application code 703), communicated through communications link 715 and communications interface 714. Received program code may be executed by data processor 707 as it is received and/or stored in the shown storage device or in or upon any other non-volatile storage for later execution. Computer system 7A00 may communicate through a data interface 733 to a database 732 on an external data repository 731. Data items in a database can be accessed using a primary key (e.g., a relational database primary key).

The processing element partition 701 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 707. Some embodiments include one or more special-purpose hardware components (e.g., power control, logic, sensors, transducers, etc.). A module may include one or more state machines and/or combinational logic used to implement or facilitate the operational and/or performance characteristics pertaining to efficiently establishing and enforcing selective operations on cloud-based shared content. A module may include instructions which, when brought into a memory and executed by a processor can implement or facilitate the operational and/or performance characteristics pertaining to efficiently establishing and enforcing selective operations on cloud-based shared content.

Various implementations of the database 732 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of efficiently establishing and enforcing selective operations on cloud-based shared content). Such files or records can be brought into and/or stored in volatile or non-volatile memory.

Figure 7B:
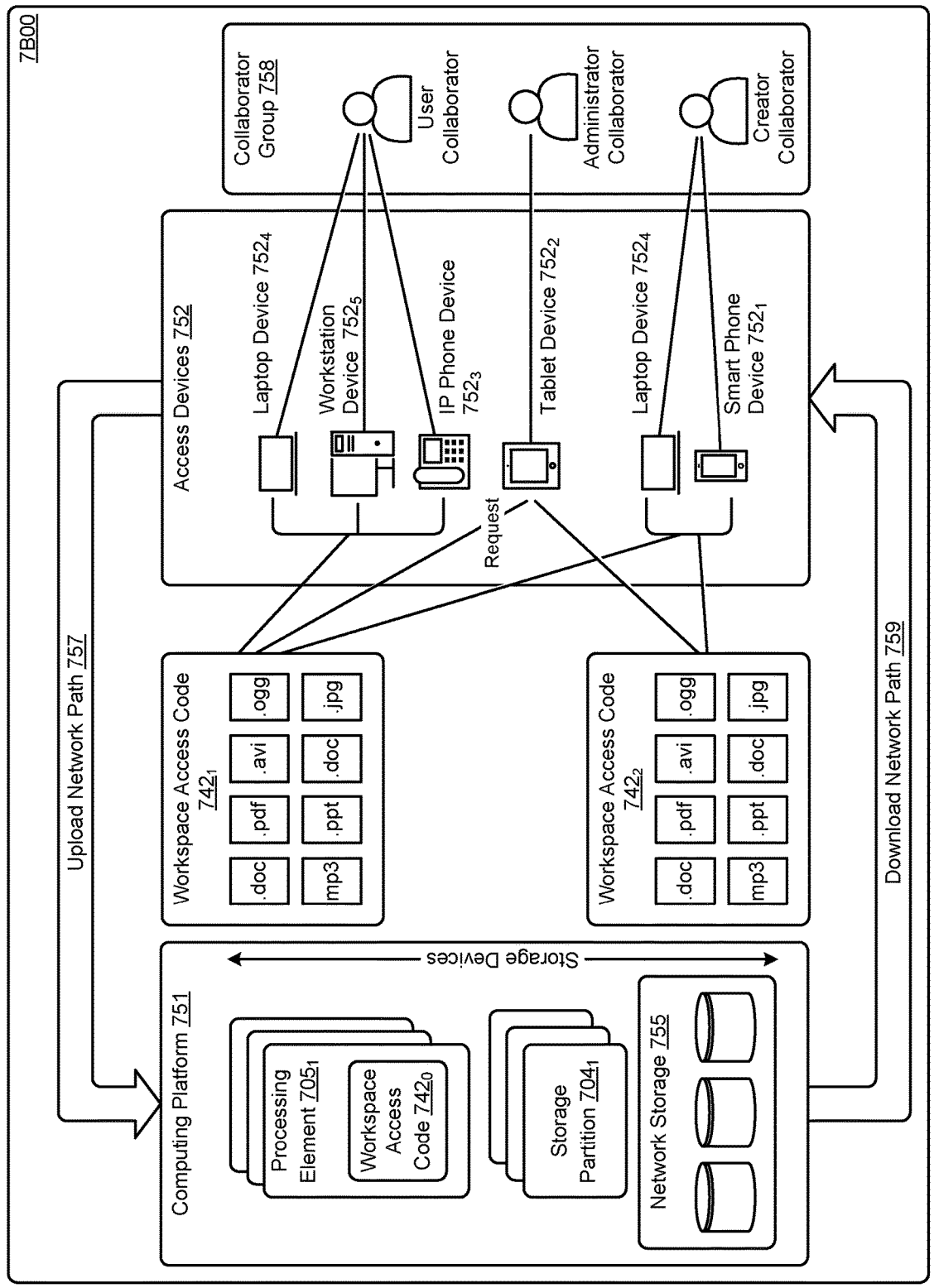

FIG. 7B depicts a block diagram of an instance of a cloud-based environment 7B00. Such a cloud-based environment supports access to workspaces through the execution of workspace access code (e.g., workspace access code $742_0$, workspace access code $742_1$, and workspace access code $742_2$). Workspace access code can be executed on any of the shown access devices 752 (e.g., laptop device $752_4$, workstation device $752_5$, IP phone device $752_3$, tablet device $752_2$, smart phone device $752_1$, etc.). A group of users can form a collaborator group 758, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 751, including in a middleware setting. As shown, a portion of the workspace access code resides in and can be executed on one or more processing elements (e.g., processing element $705_1$). The workspace access code can interface with storage devices such as the shown networked storage 755. Storage of workspaces and/or any constituent files or objects, and/or any other code or scripts or data can be stored in any one or more storage partitions (e.g., storage partition $704_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 757). A stored workspace can be delivered to a particular user and/or shared with other particular users via a download (e.g., a download from a processing element to an access device over a download network path 759).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method implemented on a processor of a computing device for reconciling multiple object deletion policies over shared content objects, the method comprising:

identifying at least two of the multiple object deletion policies, wherein a first object deletion policy corresponds to a first set of one or more first file deletion parameters that covers at least a portion of the shared content objects, a second object deletion policy corresponds to a second set of one or more second file deletion parameters that covers the at least a portion of the shared content objects, the first object deletion policy having a first priority and the second object deletion policy having a second priority, and associations are created between at least some of the file deletion parameters and the at least a portion of the shared content objects;

storing a set of policy actions for the first and second object deletion policies in columns of a table data structure comprising at least two action columns that correspond to at least one higher-ordered action column and at least one lower-ordered action column, wherein a column priority ordering is based at least in part on determining which of the multiple object deletion policies has a higher priority, wherein a first policy action for the first object deletion policy is stored in a first one of the at least two action columns and a second policy action for the second object deletion policy is stored in a second one of the at least two action columns; and determining whether or not a conflict exists for the at least a portion of the shared content objects by processing the table data structure by:

determining existence of the conflict by identifying that the first policy action in the first one of the at least two action columns conflicts with the second policy action in the second one of the at least two action columns, wherein the conflict is resolved by choosing the first policy action when the first policy action corresponds to the at least one higher-ordered action column and initiating the first policy action rather than the second policy action;

determining that the conflict does not exist by determining that the first policy action in the first one of the at least two action columns does not conflict with the second policy action in the second one of the at least two action columns, and allowing both policy actions to be performed.

2. The method of claim 1, wherein a first one of the at least two of the multiple object deletion policies is a legal hold policy and wherein a second one of the at least two of the multiple object deletion policies is a data retention policy.

3. The method of claim 2, wherein the legal hold policy comprises a "deny delete" action.

4. The method of claim 2, wherein the data retention policy comprises an "OK to delete" action.

5. The method of claim 1, further comprising determining at least one of the policy actions to take based on at least one of one or more properties of access event records, or one of the access event records.

6. The method of claim 5, wherein at least one of the policy actions to take is to disallow at least one of a delete operation, or a move operation.

7. The method of claim 5, wherein at least one of the policy actions to take is based at least in part on one of a user, a folder, a file version, or a file type.

8. The method of claim 1, wherein one or more access event records are received for processing by listening to an event stream, the one or more access event records corresponding to one or more assignment records for the first or second object deletion policies.

9. The method of claim 1, wherein the initiating comprises initiating an approval action.

10. A system for reconciling multiple object deletion policies over shared content objects, the system comprising:

a non-transitory storage medium having stored thereon a sequence of instructions; and one or more processors that execute the instructions to cause the one or more processors to perform a set of acts, the acts comprising:

identifying at least two of the multiple object deletion policies, wherein a first object deletion policy corresponds to a first set of one or more first file deletion parameters that covers at least a portion of the shared content objects, a second object deletion policy corresponds to a second set of one or more second file deletion parameters that covers the at least a portion of the shared content objects, the first object deletion policy having a first priority and the second object deletion policy having a second priority, and associations are created between at least some of the file deletion parameters and the at least a portion of the shared content objects;

storing a set of policy actions for the first and second object deletion policies in columns of a table data structure comprising at least two action columns that correspond to at least one higher-ordered action column and at least one lower-ordered action column, wherein a column priority ordering is based at least in part on determining which of the multiple object deletion policies has a higher priority, wherein a first policy action for the first object deletion policy is stored in a first one of the at least two action columns and a second policy action for the second object deletion policy is stored in a second one of the at least two action columns; and determining whether or not a conflict exists for the at least a portion of the shared content objects by processing the table data structure by:

determining existence of the conflict by identifying that the first policy action in the first one of the at least two action columns conflicts with the second policy action in the second one of the at least two action columns, wherein the conflict is resolved by choosing the first policy action when the first policy action corresponds to the at least one higher-ordered action column and initiating the first policy action rather than the second policy action;

determining that the conflict does not exist by determining that the first policy action in the first one of the at least two action columns does not conflict with the second policy action in the second one of the at least two action columns, and allowing both policy actions to be performed.

11. The system of claim 10, wherein a first one of the at least two of the multiple object deletion policies is a legal hold policy and wherein a second one of the at least two of the multiple object deletion policies is a data retention policy.

12. The system of claim 11, wherein the legal hold policy comprises a "deny delete" action.

13. The system of claim 11, wherein the data retention policy comprises an "OK to delete" action.

14. The system of claim 10, further comprising instructions to cause the one or more processors to perform the acts further comprising determining at least one of the policy actions to take based on at least one of one or more properties of access event records, or one of the access event records.

15. The system of claim 14, wherein at least one of the policy actions to take is to disallow at least one of a delete operation, or a move operation.

16. The system of claim 14, wherein at least one of the policy actions to take is based at least in part on one of a user, a folder, a file version, or a file type.

17. The system of claim 10, wherein one or more access event records are received for processing by listening to an event stream, the one or more access event records corresponding to one or more assignment records for the first or second object deletion policies.

18. The system of claim 10, wherein the initiating comprises initiating an approval action.

\* \* \* \* \*